(12) United States Patent
Gandhewar et al.

(10) Patent No.: US 8,631,100 B2
(45) Date of Patent: Jan. 14, 2014

(54) AUTOMATIC ASSIGNMENT OF HARDWARE ADDRESSES WITHIN COMPUTER NETWORKS

(75) Inventors: Sunil Gandhewar, Nashua, NH (US); John Liddy, Gardner, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 501 days.

(21) Appl. No.: 12/840,119

(22) Filed: Jul. 20, 2010

(65) Prior Publication Data

US 2012/0023207 A1  Jan. 26, 2012

(51) Int. Cl.
*G06F 13/00* (2006.01)

(52) U.S. Cl.
USPC ........................................ 709/221

(58) Field of Classification Search
USPC ........................................ 709/221
See application file for complete search history.

(56) References Cited

U.S. PATENT DOCUMENTS

| | | | |
|---|---|---|---|
| 6,243,749 B1 | 6/2001 | Sitaraman et al. |
| 6,578,074 B1 | 6/2003 | Bahlmann |
| 6,957,276 B1 | 10/2005 | Bahl |
| 6,982,953 B1 | 1/2006 | Swales |
| 7,178,059 B2 | 2/2007 | Greenspan et al. |
| 7,197,549 B1 | 3/2007 | Salama et al. |
| 7,292,538 B1 | 11/2007 | O'Rourke et al. |
| 7,321,893 B1 | 1/2008 | Rambacher et al. |
| 7,386,629 B2 | 6/2008 | Rover et al. |
| 7,533,165 B2 | 5/2009 | Makino |
| 7,624,181 B2 | 11/2009 | Townsley et al. |
| 7,648,070 B2 | 1/2010 | Droms et al. |
| 7,792,942 B1 | 9/2010 | Regan et al. |
| 7,991,863 B2 | 8/2011 | Zhao |
| 8,036,237 B2 | 10/2011 | Kolli et al. |
| 2003/0076805 A1 | 4/2003 | Agrawal et al. |
| 2005/0044273 A1* | 2/2005 | Bouchat et al. ............... 709/245 |

(Continued)

FOREIGN PATENT DOCUMENTS

| | | |
|---|---|---|
| JP | 2004356920 A | 12/2004 |
| WO | 03081875 A1 | 10/2003 |
| WO | 2005050897 A2 | 6/2005 |

OTHER PUBLICATIONS

McAuley et al. "Experience with Autoconfiguring a Network with IP Addresses", Proceedings: Communications for Network-Centric Operations: Creating the Information Force, Oct. 28-30, 2001, Mclean, VA, Telcordia Technologies, Inc., 2001, p. 272-276.

(Continued)

*Primary Examiner* — Robert B Harrell
(74) *Attorney, Agent, or Firm* — Shumaker & Sieffert, P.A.

(57) ABSTRACT

In general, techniques are described for automatic assignment of hardware addresses within computer networks. As one example, a network device comprising a physical network interface and a control unit may implement these techniques. The network interface receives a first message from a client device requesting a layer three (L3) network address. The first message also includes a layer two (L2) hardware address currently assigned to a network interface of the client device. The control unit selects a replacement L2 hardware address for use by the network interface of the client device as a replacement for the L2 hardware address included in the first message and generates a second message having a field that specifies the replacement L2 hardware address. The network interface outputs the second message to the client device so as to automatically assign the replacement L2 hardware address for use by the network interface of the client device.

46 Claims, 7 Drawing Sheets

(56) References Cited

U.S. PATENT DOCUMENTS

| | | |
|---|---|---|
| 2005/0097223 A1 | 5/2005 | Shen et al. |
| 2005/0122946 A1 | 6/2005 | Won |
| 2005/0253718 A1 | 11/2005 | Droms et al. |
| 2005/0253722 A1 | 11/2005 | Droms et al. |
| 2006/0031488 A1 | 2/2006 | Swales |
| 2006/0047791 A1 | 3/2006 | Bahl |
| 2006/0155563 A1 | 7/2006 | Banerjee et al. |
| 2006/0221846 A1 | 10/2006 | Dyck et al. |
| 2007/0002833 A1 | 1/2007 | Bajic |
| 2007/0180499 A1 | 8/2007 | Van Bemmel |
| 2007/0203999 A1 | 8/2007 | Townsley et al. |
| 2007/0214352 A1 | 9/2007 | Convery et al. |
| 2008/0046597 A1 | 2/2008 | Stademann et al. |
| 2008/0065747 A1 | 3/2008 | Kubota |
| 2009/0154406 A1 | 6/2009 | Kim et al. |
| 2009/0257425 A1 | 10/2009 | Sastry et al. |
| 2010/0042707 A1 | 2/2010 | Zhao |
| 2010/0042714 A1 | 2/2010 | Choi et al. |
| 2010/0191813 A1 | 7/2010 | Gandhewar et al. |
| 2010/0191839 A1 | 7/2010 | Gandhewar et al. |

OTHER PUBLICATIONS

Droms, R. and R. Cole, "An Inter-server Protocol for DHCP; draft-ietf-dhc-interserver-01.txt" Network Working Group, Internet Draft, Mar. 1997, p. 1-31.

Juniper Networks, Inc., "JUNOS Software Subscriber Access Configuration Guide—DHCP Auto Logout Overview," Release 9.4, Jan. 15, 2009, retrieved from the internet: URL: http://www.juniper.net/techpubs/en_US/junos9.4/information-products/topic-collections/subscriber-access/swconfig-subscriber-access.pdf, 38 pp.

Droms, R., "Dynamic Host Configuration Protocol," RFC 2131, IETF Standard, Internet Engineering Task Force, Mar. 1997, 46 pp.

Alexander, S. et al., "DHCP Options and BOOTP Vendor Extensions," RFC 2132, IETF Standard, Internet Engineering Task Force, Mar. 1997, 35 pp.

Patrick M., "DHCP Relay Agent Information Option," RFC 3046, IETF Standard, Internet Engineering Task Force, Jan. 2001, 15 pp.

Droms, R. et al., "Dynamic Host Configuration Protocol for IPv6 (DHCPv6)," RFC 3315, IETF Standard, Internet Engineering Task Force, Jul. 2003, 17 pp.

Lai, K., "Change (SPOOF) MAC Address on Windows 2000, XP, 2003, VISTA, 2008, Windows 7," KLC Consulting, Inc., May 2007, retrieved from the internet: URL: http://www.klcconsulting.net/change_mac_w2k.htm, 8 pp.

File Buzz, "Change Mac Address," last accessed on Mar. 8, 2010, retrieved from the internet: URL: http://www.filebuzz.com/files/Change_Mac_Address/1.html, 4 pp.

File Buzz, "Gentle MAC Pro v4.0," Solar System Technologies, Jul. 4, 2007, retrieved from the internet: URL: http://www.filebuzz.com/fileinfo/32000/Gentle_MAC_Pro.html, 2 pp.

File Buzz, "MacIP Change v1.0," FUSION Soluciones Informaticas, Jul. 5, 2007, retrieved from the internet: URL: http://www.filebuzz.com/fileinfo/36702/MacIP_Change.html, 2 pp.

* cited by examiner

AUTOMATIC ASSIGNMENT OF HARDWARE ADDRESSES WITHIN COMPUTER NETWORKS

TECHNICAL FIELD

The invention relates to computer networks and, more particularly, allocating hardware addresses for use by network devices within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

To route the packets through the computer network, each network device may be assigned an address that uniquely identifies each of the requesting network devices. Each packet may then include a source address uniquely identifying the network device that originated the packet and a destination address uniquely identifying the network device to which the packet is destined. Intermediate devices, referred to as routers, may route the packets to the destination device based on the destination address included within the packet.

Before attempting to access the network, each network device may request configuration information that includes an Internet Protocol (IP) address in accordance with a Dynamic Host Configuration Protocol (DHCP). For example, a subscriber device (e.g., a cable modem, a digital television setup box, a Digital Subscriber Line (DSL) modem) may request a layer three IP network address by issuing a DHCP request. The DHCP request issued by the subscriber device may specify a hardware address, e.g. MAC address, of a network interface of the requesting network device. This hardware address is typically configured within a network interface card at the time of manufacture and is commonly used within the computer network to uniquely identify the requesting device. A DHCP server or other system that maintains an IP address space for the network may receive this request, reserve an IP address with the IP address space and assign the IP address to the requesting network device. The DHCP server then formulates a response in the form of layer two (L2) message and forwards the response back to the network device so as to assign the reserved IP address to the requesting network device. To forward this response back to the network device, the DHCP server formulates the L2 message with the hardware address specified in the DHCP request as the destination address.

SUMMARY

In general, techniques are described for automatically assigning hardware addresses within computer networks in a manner that ensures the hardware addresses are unique within the computer network. For example, although manufacturers of the network interface cards and network devices attempt to utilize hardware addresses that are globally unique, in some cases conflicts may occur once the devices are deployed within customer networks. For example, each manufacturer may maintain different addresses spaces from which to select hardware addresses, but may re-use hardware addresses over time, resulting in instances where two or more different physical network interfaces are manufactured with the same hardware address. If these network devices are ultimately deployed in the same sub-network or a network that requires its network devices to be uniquely identifiable, communications using those addresses result in conflicts that may be unresolvable.

To illustrate, consider that the DHCP response described above relies on the hardware address from the DHCP request to identify which of the network devices should receive the DHCP response. If two or more network devices are each assigned the same hardware address, the intermediate devices positioned between the DHCP server and these network devices or the DHCP server itself cannot determine to which of these network devices to forward the DHCP response. In this respect, protocols that rely on hardware addresses to uniquely identify network devices, such as DHCP, may be unable to properly resolve to which network device a given communication or message is to be sent. In the case of DCHP, this inability to uniquely identify a network device may prevent assignment of an IP address to this network device, which may effectively prevent the network device from being able to access a public network, such as the Internet.

The techniques described herein may utilize the dynamic host configuration protocol (DHCP) to perform the automatic reassignment of hardware addresses after a network device is deployed within a network. In particular, the techniques described herein may be used to extend DHCP to include a define DHCP option referred to herein as a "New Hardware Address" option that specifies a new hardware address for use in reprogramming the existing hardware address pre-programmed into the network interface by the manufacture of the network interface. In this way, the techniques may enable a DHCP server to provide a new hardware address in a DHCP response communication for use by a requesting network device, or so-called "client" in the context of DHCP. If the requesting network device supports the techniques describe in this disclosure, the requesting network device or client may automatically reprogram its network interface to replace the existing pre-programmed hardware address with the new hardware address provided via the "New Hardware Address" DHCP option. In this manner, the techniques enable automatic assignment of hardware addresses to prevent hardware address conflicts within a computer network.

The techniques may provide one or more benefits. For example, the techniques may reduce administrative oversight as the assignment of hardware addresses to prevent hardware address conflicts occurs automatically. That is, the administrator of any given computer network may configure the DHCP server to perform the automatic assignment of hardware addresses in accordance with the techniques of this disclosure, whereupon the DHCP server may proceed to implement these techniques without requiring any human or administrative intervention. Rather than require administrators to manually interface with each network device within a given uniquely addressable computer network and execute software or other commands to reprogram a hardware address of each network interface, the techniques may automatically determine when to assign a new hardware address, e.g., upon detecting a hardware address conflict, and then assign the new hardware address to overcome this hardware address conflict. Moreover, the administrator need not ensure that clients having network interfaces programmed with the same hardware address are assigned to different uniquely addressable computer networks, e.g., sub-networks, but can rely on the techniques to ensure that hardware address conflicts do not occur within these uniquely addressable computer networks. The techniques may therefore reduce overhead associated with planning and maintaining computer networks as well as complications associated with connecting clients to the public network.

In one embodiment, a method comprises receiving, with a network device of a network, a first message from a client device of the network, wherein the first message requests that a layer three (L3) network address be reserved for use by the client device, and wherein the first message also includes a layer two (L2) hardware address currently assigned to a physical network interface of the client device and selecting, with the network device, a replacement L2 hardware address for use by the network interface of the client device as a replacement for the L2 hardware address included in the first message. The method also comprises generating, with the network device, a second message having a field that specifies the replacement L2 hardware address, and outputting, with the network device, the second message to the client device in response to the first message so as to automatically assign the replacement L2 hardware address for use by the network interface of the client device.

In another embodiment, a network device comprises a physical network interface that receives a first message from a client device of a network, wherein the first message requests that a layer three (L3) network address be reserved for use by the client device, and wherein the first message also includes a layer two (L2) hardware address currently assigned to the network interface of the client device and a control unit that selects a replacement L2 hardware address for use by the network interface of the client device as a replacement for the L2 hardware address included in the first message and generates a second message having a field that specifies the replacement L2 hardware address. The network interface outputs the second message to the client device in response to the first message so as to automatically assign the replacement L2 hardware address for use by the network interface of the client device.

In another embodiment, a non-transitory computer-readable storage medium comprises instructions that cause a processor of a network device to receive a first message from a first client device of the network, wherein the first message requests that a layer three (L3) network address be reserved for use by the client device, and wherein the first message also includes a layer two (L2) hardware address associated with an network interface of the client device, select a replacement L2 hardware address for use by the network interface of the client device as a replacement for the L2 hardware address included in the first message, generate a second message having a field that specifies the replacement L2 hardware address and output the second message to the client device in response to the first message so as to automatically assign the replacement L2 hardware address for use by the network interface of the client device.

In another embodiment, a method comprises generating, with a client device located in a sub-network (subnet) of a network, a first message requesting that a layer three (L3) network address be reserved for use by the client device in the network, wherein the first message also includes a layer two (L2) hardware address associated with an network interface of the client device and outputting, with the client device, the first message to a network device responsible for allocating leases for L3 network addresses to client devices. The method also comprises receiving, with the client device, a second message having a field that specifies a replacement L2 hardware address for use in the network as a replacement for the L2 hardware address included in the first message and automatically replacing, with the client device, the L2 hardware address associated with the network interface of the client device with the replacement L2 hardware address specified in the second message.

In another embodiment, a client device comprises a physical network interface and a control unit that generates a first message requesting that a layer three (L3) network address be reserved for use by the client device in the network, wherein the control unit generates the first message to specify a layer two (L2) hardware address currently assigned to the physical network interface of the client device. The network interface outputs the first message to a network device responsible for allocating leases for L3 network addresses to client devices and receives a second message having a field that specifies a replacement L2 hardware address for use in the network as a replacement for the L2 hardware address included in the first message. The control unit outputs one or more signals to the physical network interface to automatically replace the L2 hardware address currently assigned to the network interface with the replacement L2 hardware address specified in the second message.

In another embodiment, a non-transitory computer-readable storage medium comprises instructions that cause a processor of a client device to generate a first message requesting that a layer three (L3) network address be reserved for use by the client device in a network, wherein the first message also includes a layer two (L2) hardware address associated with a network interface of the client device, output the first message to a network device responsible for allocating leases for L3 network addresses to client devices, receive a second message having a field that specifies a replacement L2 hardware address for use in the network as a replacement for the L2 hardware address included in the first message and automatically replace the L2 hardware address associated with the network interface of the client device with the replacement L2 hardware address specified in the second message.

In another embodiment, network system comprising a client device located in a sub-network (subnet) of a network and a dynamic host configuration protocol (DHCP) server located in the network that is responsible for allocating leases for L3 network addresses to client devices. The client device includes a first physical network interface and a first control unit that generates a first message requesting that a layer three (L3) network address be reserved for use by the client device in the network, wherein the first message also includes a layer two (L2) hardware address associated with the first network interface of the client device. The first network interface outputs the first message to the DHCP server. The DHCP server includes a second physical network interface that receives the first message from the client device and a second control unit that selects a replacement L2 hardware address for use by the first network interface of the client device as a replacement for the L2 hardware address included in the first message and generates a second message having a field that specifies the replacement L2 hardware address. The second network interface outputs the second message to the client device. The first network interface of the client device receives the second message. The first control unit automatically replaces the L2 hardware address associated with the first network interface of the client device with the replacement L2 hardware address specified in the second message.

In another embodiment, a method comprises generating, with a client device located in a sub-network (subnet) of a network, a first message requesting that a layer three (L3) network address be reserved for use by the client device in the network, wherein the first message also includes a layer two (L2) hardware address associated with an network interface of the client device, outputting, with the client device, the first message to a network device responsible for allocating leases for L3 network addresses to client devices, receiving, with the client device, a second message having a field that specifies a replacement L2 hardware address for use in the network as a replacement for the L2 hardware address included in the first message and indicating, with the client device, to a user of the client device that the user needs to change the L2 hardware address to the replacement L2 hardware address.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
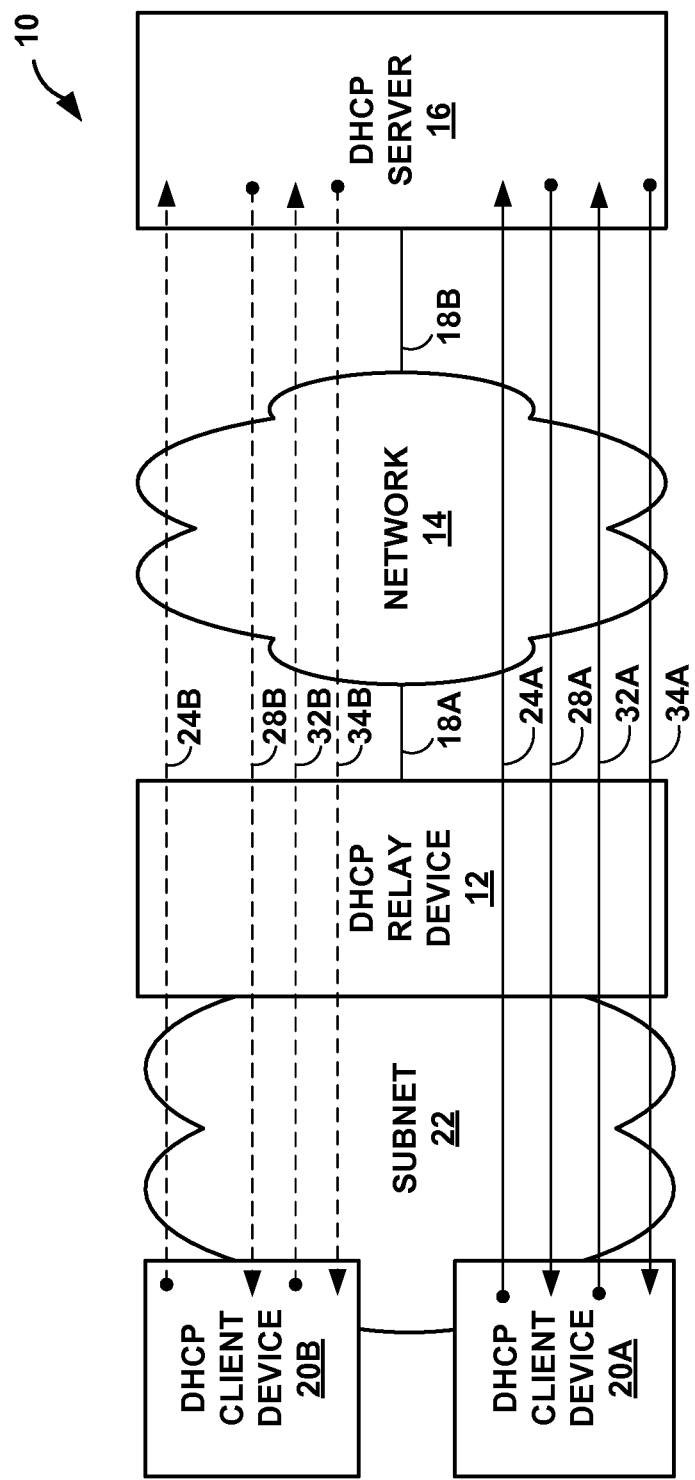
FIG. 1 is a block diagram illustrating an exemplary network system in which a network device represented by dynamic host configuration protocol (DHCP) server implements the automatic hardware address assignment techniques described in this disclosure.

FIG. 1 is a block diagram illustrating an exemplary network system 10 in which a network device represented by dynamic host configuration protocol (DHCP) server 16 implements the automatic hardware address assignment techniques described in this disclosure. In the example of FIG. 1, device 16 is shown as a Dynamic Host Configuration Protocol (DHCP) server 16, however, the automatic hardware address techniques may be implemented by any network device, such as a router, a switch, a hub, a computer or any other device capable of receiving and communicating messages for the reservation of resources within a network system, such as network system 10. Moreover, while described with respect to a particular protocol for reserving resource, e.g., DHCP, the techniques may apply to any network address allocation protocol by which a network device may request and reserve network addresses for operating within network system 10.

As shown further in the example of FIG. 1, network system 10 includes a network 14 and a DHCP relay device 12, where DHCP relay device 12 and a DHCP server 16 couple to network 14 via respective network links 18A, 18B. Network 14 may represent any publically accessible computer network, such as the Internet. Network 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. Typically, these devices communicate with one another via a packet-based protocol, such as an Internet Protocol (IP)/Transmission Control Protocol (TCP). As a result, network 14 may represent or be referred to as a "packet-based" or an "IP packet-based" computer network.

DHCP server 16 may represent a network device that allocates layer three network addresses (e.g., IP network addresses) for network system 10. In particular, DHCP server 16 may maintain access to an address pool, such as an Internet Protocol (IP) address pool. DHCP server 16 may also maintain access to other resources, such as configuration files that provide pertinent configuration information. DHCP server 16 may reserve an IP address within the IP address pool for use by one or more DHCP clients, such as DHCP client devices 20A, 20B ("DHCP client devices 20"), in accordance with DHCP, as described in more detail below.

Network system 10 may further include DHCP client devices 20A, 20B ("DHCP client devices 20"), each of which couple to DHCP relay device 12 via one or more connections (not shown) included within sub-network 22 ("subnet 22"). DHCP client devices 20 may each represent a subscriber device, such as one or more of a Set-Top Box (STB), a personal computer, a laptop computer, a modem, a workstation, a personal digital assistant (PDA), a cellular phone or other mobile device (e.g., a so-called "smart phone") or any other device capable of accessing a network, such as network 14. These devices 20 may be "DHCP clients" in that these devices implement DHCP to request, as a client to the DHCP server or host device 16, L3 network addresses (e.g., IP addresses) and other resources maintained by DHCP server 16 useful or required for operating within network system 10.

Subnet 22 may represent a portion of a larger network, which is not shown in FIG. 1 for ease of illustration purposes, hence the name "subnet." The larger network may be generally referred to as an access network in that this network enables client devices to access network 14. As subnet 22 comprises a portion of this access network and similarly facilitates access of network 14 by client devices 20, subnet 22 may similarly be referred to as an access network. Generally, access networks implement IP, and with respect to IP, subnets or IP subnets, such as subnet 22, may be identified by an IP address prefix.

An IP subnet may represent a "network area" in that the IP subnet may be identified by a contiguous set of IP addresses or an IP prefix that defines a distinct area within an IP address space of the larger access network. The IPv4 address space comprises $2^{32}$ distinct IP addresses, as each IP address may correspond to a 32-bit binary number. Typically, an IP address is presented in four eight bit binary numbers (or, in other words, four bytes) with each eight bit binary number or byte separated by a period (.), which is a notation referred to as a quad-dotted decimal representation. For example, one IP address may be presented as 10.0.0.1. However, as a byte may represent a number as large as $2^8-1$ or $255_{10}$, each byte may represent a range of numbers from 0 to 255 in decimal, such that each IP address may vary from 0.0.0.0 to 255.255.255.255 again in quad-dotted decimal representation or notation.

An IP prefix identifies a subset of addresses with the IP address space and those addresses may be assigned to devices within a particular area within the larger access network. An IP prefix usually identifies a contiguous set of IP addresses within the IP address space. For example, an IP prefix may identify a contiguous set of IP addresses from 10.0.0.1 to 10.0.0.255. This IP prefix may be represented by a routing prefix or 10.0.0 followed by a subnet mask identifier (which in this instance may be represented as $24_{10}$ to indicate that the first 24 bits should be 1's within the subnet mask, e.g., 255.255.255.0 in quad-dotted decimal notation), where the prefix and scope identifier may be separated by a slash (/). The IP prefix may therefore be presented as 10.0.0.0/24 suggesting that only the first 24 bits of the 32-bit IP address are necessary to reach the IP subnet (or area) corresponding to the IP prefix. In this instance, the IP prefix may define a routing prefix and may represent a summarized version of the contiguous set of IP addresses.

According to DHCP, each subnet, such as subnet 22, requires either a DHCP server, such as DHCP server 16, or a DHCP relay device, such as DHCP relay device 12, by which to reserve and assign IP addresses to network devices, such as DHCP client devices 20, operating within the respective subnet. As DHCP servers may maintain network resources for a large number of DHCP clients, often, for small subnets, network administrators will utilize one or more DHCP servers or server clusters to service a number of subnets. To do so, the network administrators may maintain one DHCP server, such as DHCP server 16, in a central location and then configure multiple DHCP relay devices, one or more for each subnet, to relay DHCP messages from DHCP clients located within the respective one of the subnets to the single DHCP server or server cluster. While network system 10 shown in the example of FIG. 1 is configured according to this second alternative where the DHCP relay device relays messages between the subnet and the DHCP server, the techniques may apply equally in network systems 10 that include client devices and DHCP servers located in the same subnet.

Typically, in these instances, a router or other network device already present within each subnet may provide this DHCP relay service as an optional service that the network administrators may enable in this context. In this respect, DHCP relay device 12 may represent a router or some other similar network device, such as a switch or a hub that provides this DHCP relay service as an optional service. Alternatively, DHCP relay device 12 may represent a dedicated relay device and may comprise any device capable of relaying DHCP messages in the manner described below in more detail. Thus, DHCP relay device 12 may represent any intermediate network device positioned between DHCP client devices 20 and DHCP server 16 that implements DHCP to relay DHCP messages between DHCP clients 20 and DHCP server 16.

Generally, upon booting up or otherwise powering up and initializing its various components, DHCP client devices 20 attempt to secure an IP address for use in accessing network 14. For example, when initialing various hardware components during the power on process, DHCP client device 20A may initialize an interface card, which is not shown in the example of FIG. 1 for ease of illustration purposes. Typically, the interface card stores data defining a layer two (L2) network address, which was statically programmed by a manufacture of the interface card. This L2 hardware address is also referred to commonly as a "hardware address" as this L2 hardware address identifies the hardware, i.e., the interface card in this example. One example of a hardware address is a media access control (MAC) address. Reference to layers throughout this disclosure followed by a number is intended to indicate the corresponding layer in the Open Systems Interconnections (OSI) model.

When initializing this interface card, DHCP client device 20A issues a DHCP message 24A that is commonly referred to as a DHCP discover message. This DHCP discover message 24A initiates the DHCP process by which DHCP client device 20A requests that a layer three (L3) network address, where an IP address is one example of a L3 network address, be reserved for use by DHCP client device 20A. In most instances, the DHCP discover message includes a field that stores the L2 hardware address stored by the interface card, where this L2 hardware address is supposed to uniquely identify this interface card of DHCP client device 20A within at least subnet 22 and, potentially, network 14.

While this L2 hardware address is supposed to uniquely identify the interface card of DHCP client device 20A, the manufacturers of such interface cards and other hardware components that require L2 hardware addresses often reuse hardware or L2 addresses such that two or more interface cards from the same manufactures may, in fact, be assigned the same L2 hardware address. Many protocols, such as DHCP, however assume that the L2 hardware address assigned to each interface card is unique within the subnet. In instances where two or more DHCP client devices each include interface cards or other hardware components that are assigned the same L2 hardware address, network operations may be impacted due to the inability to resolve this L2 hardware address as belonging to a single DHCP client device.

To illustrate, consider an instance where both DHCP client devices 20A, 20B include a single interface card assigned the same L2 hardware address. As noted above, DHCP client device 20A issues a DHCP discover message 24A, which includes a field that stores the L2 hardware address assigned to the interface card of DHCP client device 20A. DHCP relay device 12 relays this message 24A to DHCP server 16, which responds with a DHCP offer message 28A. Again, DHCP relay device 12 relays this message 28A to DHCP client device 20A. DHCP offer message 28A offers DHCP client device 20A a lease reserving a L3 network address for use by DHCP client device 20A. Assuming DHCP client device 20A accepts this lease presented in DHCP offer message 28A, DHCP client device 20A generates and issues a DHCP request message 32A requesting the lease offered in DHCP offer message 28A. DHCP relay device relays this message to DHCP server 16, which responds with a DHCP acknowledgment (ACK) message 34A acknowledging that lease for the L3 network address has been accepted by DHCP client device 20A. Again, DHCP relay device 12 relays this message to DHCP client device 20A. After receiving DHCP ACK message 34A, DHCP client device 20A assigns the leased L3 network address for use by its interface card. More information regarding DHCP in general, and specifically the various messages 26A, 28A, 32A, 34A, can be found in Request for Comments (RFC) 2131, entitled "Dynamic Host Configuration Protocol," dated March 1997, the entire contents of which are incorporated herein as if set forth in its entirety.

At some point in time after DHCP client device 20A has secured its lease for the L3 hardware address, DHCP client device 20B generate and issue a DHCP discover message 24B while powering up or otherwise initializing its single interface card assigned the same L2 hardware address as that of the interface card of DHCP client device 20A. DHCP discover message 24B also includes a field that stores the L2 hardware address assigned to the interface card of DHCP client device 20B. In this instance, this field stores the same L2 hardware address as stored by this field in DHCP discover message 24A. DHCP server 16 receives this discover message 24B and parses this field to extract the L2 hardware address. DHCP server 16 usually stores data defining a table that associates L2 hardware addresses with corresponding L3 network addresses reserved for use by the hardware components identified by the corresponding L2 hardware addresses.

Using the L2 hardware address parsed from DHCP discover message 24B, DHCP server 16 identifies an entry in this table that identifies an association between this L2 hardware address and the L3 network address assigned to DHCP client device 20A. That is, because the interface cards of both DHCP client devices 20 are assigned the same L2 hardware address, DHCP server 16 cannot properly resolve to which one of DHCP client devices 20 the L2 hardware address identifies. DHCP server 16, in this instance, more than likely responds to DHCP discover message 24B with DHCP offer message 28B offering the same lease for the same IP address offered to DHCP client device 20A. Assuming DHCP client device 20B accepts the lease for the L3 network address presented in DHCP offer message 28B via a DHCP request message 32B and DHCP server 16 acknowledges this acceptance via a DHCP ACK message 34B, the interface cards of both DHCP client devices 20 may be using the same L3 network address. This dual use of the same L3 network address presents a number of conflicts in routing L3 packets to the correct one of DHCP client devices 20, as again, it is generally assumed throughout the network that a L3 network address uniquely identifies any given client device within at least subnet 22.

Alternatively, DHCP server 16 may incorrectly assume that DHCP discover message 24B originated from DHCP client 20A. In this instance, DHCP server 16 releases the MAC address and IP address binding associating the IP address assigned to DHCP client 20A with the non-unique MAC address. After releasing this binding, DHCP server 16 then responds with a DHCP offer message offering another IP address for use by the requesting one of DHCP clients 20. In this respect, DHCP server 16 configures subnet 22 such that only one of DHCP clients 20 having the same MAC address is assigned an IP address, resulting in only one of DHCP clients 20 being able to access public network 14. Moreover, DHCP relay device 12 normally unicast DHCP messages, and in this instance, both of DHCP client devices 20 may receive this DHCP offer message. DHCP client 20A, having already accepted its lease for the IP address, may not be able to understand this message considering that it did not originate DHCP discover message 24B. DHCP client 20A may then experience issues as a result of not understanding this message with respect to its current state.

To avoid this issues, network administrators may manually configure network system 10 such that each of DHCP client devices 20 having hardware components assigned the same L2 hardware address reside in different subnets, which may represent a network that requires unique addressability to properly function. However, manually configuring network system 10 in this manner is often tedious, time consuming and prone to error. Moreover, each subnet configured for this purpose also requires its own DHCP relay device similar to DHCP relay device 12, which may increase the cost in setting up and maintaining this network system 10. Furthermore, this solution does not protect against instances where devices move between subnets, which is becoming increasingly common considering the growth of portable computers, such as laptops, so-called smart phones, and slate computers. To illustrate, assume the network administrator configured each of DHCP client devices 20 such that each resides in its own subnet similar to subnet 22. This may effectively prevent addressing conflicts between DHCP client devices 20. However, if DHCP client device 20B is moved such that is accesses network 14 from the subnet in which DHCP client device 20A resides, the addressing conflict described above results.

Another way to avoid these types of addressing issues or conflicts (even in instances where the network administrator has manually configured the network system such that each of these devices reside in separate subnets) is to manually reprogram the hardware components or software that controls the hardware components to use a different L2 hardware address. This manually reprogramming generally requires a network administrator to interface with each DHCP client device and reprogram those devices often using software, which again is tedious, time consuming and prone to error. In large networks having hundreds, thousands, if not tens of thousands of DHCP client devices per subnet, both solutions to overcome these addressing conflicts require substantial time and potentially increase administrative costs in terms of maintaining a consistent addressing strategy.

In accordance with the automatic L2 hardware address assignment techniques described in this disclosure, DHCP server 16 may automatically (which in this instance may indicate that no administrative oversight is required other than to initially provision or configure this automatic hardware address assignment service) assign a L2 hardware address for use by a requesting one of DHCP client devices 20 so as to avoid these addressing conflicts. Considering this assignment of these hardware addresses is automatic, the network administrator need not spend time manually configuring each address conflicted DHCP client devices, such as DHCP client devices 20, to reside within its own subnet, such as subnet 22, or to reprogram L2 hardware addresses stored by the interface cards of these address conflicted DHCP client devices. As a result, the techniques may reduce the amount of time required to provision a new DHCP client device to access network 14, especially considering that the automatic hardware address assignment techniques described in this disclosure may reduce if not eliminate configuration error that often results when manually configuring networks.

To illustrate these automatic hardware address assignment techniques, assume DHCP client device 20A issues DHCP discover message 24A to DCHP server 16. In some instances, DHCP client device 20A may signal whether or not it supports automatic hardware address assignment in DHCP discover message 24A. In these instances, DHCP client device 20A sets a flag or defines another new option referred to as a "Supports Configurable Hardware Address" option or includes a "New Hardware Address" option within a so-called "parameter request list option" in DHCP discover message 24A to signal its support of the automatic hardware address assignment techniques described in this disclosure. DHCP client device 20A generally includes a DHCP client software module (which represents software instructions) that executes within a hardware module, such as a processor. If DHCP client device 20A supports the techniques described in this disclosure, this DHCP client software module may include a hardware address programming module that is capable of dynamically reprogramming either an operating system or some other management software or the interface card itself to replace the manufacturer programmed L2 hardware address (which, again may be referred to as a hardware address) with a L2 hardware address specified by DHCP server 16.

DHCP server 16 receives DHCP discover message 24A and parses this DHCP discover message 24A to extract the indication of whether DHCP client device 20A supports the automatic hardware address assignment techniques described in this disclosure. If this indicator indicates that DHCP client device 20A does not support the techniques described in this disclosure, DHCP server 16 proceeds to respond in a conventional manner so as to provide a lease for at least one network resource, e.g., a L3 network address, to DHCP client device 20A. Alternatively, DHCP server 16 may be administratively configured not to allow such clients. In which case, DHCP server 16 denies such clients by not sending the DHCP offer message. As another alternative, if two ore more clients are determined to be using the same hardware address, DHCP server 16 can either deny this new client or use the above described conventional method depending upon the administrative configuration. However, if this indicator indicates that DHCP client device 20A supports the automatic hardware address assignment techniques described in this disclosure, DHCP server 16 performs one of two variations of the techniques to automatically assign a replacement hardware address for use by DHCP client device 20A.

In the first variation of these techniques, DHCP server 16 always assigns a replacement L2 hardware address regardless of whether the L2 hardware address is provided as a source address in DHCP discover message 24A. DHCP server 16 stores data defining a L2 hardware address pool that generally represents a contiguous set of L2 hardware addresses reserved for use by the network service provider that owns and operates network system 10. DHCP server 16 selects a next available L2 hardware address from the L2 hardware address pool and generates DHCP offer message 28A in such a manner that it includes the selected L2 hardware address as a replacement L2 hardware address. In some instances, this replacement L2 hardware address is specified within DHCP offer message 28A in a new type-length-value (TLV) field that may be referred to as either a "new hardware address field" or a "replacement hardware address field." DHCP server 16 then outputs this DHCP offer message 28A to DHCP client device 20A.

In the second variation of these techniques, DHCP server 16 also parses a source address field to extract a source L2 hardware address, which the interface card of DHCP client device 20A typically populates with the L2 hardware address assigned to the interface card by the manufacture (assuming that DHCP client device 20A has not already undergone the techniques described in this disclosure prior to issuing DHCP discover message 24A). In any event, DHCP server 16 stores data defining a current L2 hardware address usage table that identifies those of the L2 hardware addresses currently in use by DHCP client devices within any given subnet, such as subnet 22. In some instances, this current L2 hardware address usage table is divided by subnet such that this table may represent a plurality of tables, each of which are associated with a different subnet. DHCP server 16 therefore also parses a subnet address from DHCP discover message 16 to retrieve the correct one of these tables or otherwise access the appropriate portion of this table and then indexes into the table using the extracted L2 hardware address. If this extracted L2 hardware address is identified as currently in use by another DHCP client device operating within the same subnet, DHCP server 16 proceeds to assign the new or replacement L2 hardware address via DHCP offer message 28A in the manner described above with respect to the first variation of the techniques described in this disclosure.

Assuming DHCP server 16 either implement the first variation of the techniques or detects that the extracted L2 hardware address is currently in use by another DHCP client device in subnet 22, DHCP client device 20A receives DHCP offer message 28A with the new or replacement L2 hardware address, whereupon the hardware address programming module extracts the replacement L2 hardware address from DHCP offer message 28A and programs the interface card, operating system or other any other hardware components or management software to use the replacement L2 hardware address in place of the one programmed or specified by the manufacturer. After reprogramming this L2 hardware address, DHCP client device 20A may issue another DHCP discover message and reinitiate the request for the network resource using the replacement L2 hardware address or continue the current request for the network resource initiated by DHCP discover message 28A by sending a DHCP request message 32A using the replacement L2 hardware address to identify the source address.

Regardless of how DHCP client device 20A secures the lease for the L3 network address after replacing the old L2 hardware address with the replacement L2 hardware address, which is described below in more detail, the techniques promote automatic address conflict resolution either by way of replacing any L2 hardware addresses regardless of a detected conflict or only replacing L2 hardware addresses upon detecting an L2 address conflict. Consequently, a network administrator or other network operator need not manually reconfigure either network system 10 or DHCP client devices 20 to overcome L2 address conflicts, thereby potentially saving time and reducing costs.

Figure 2:
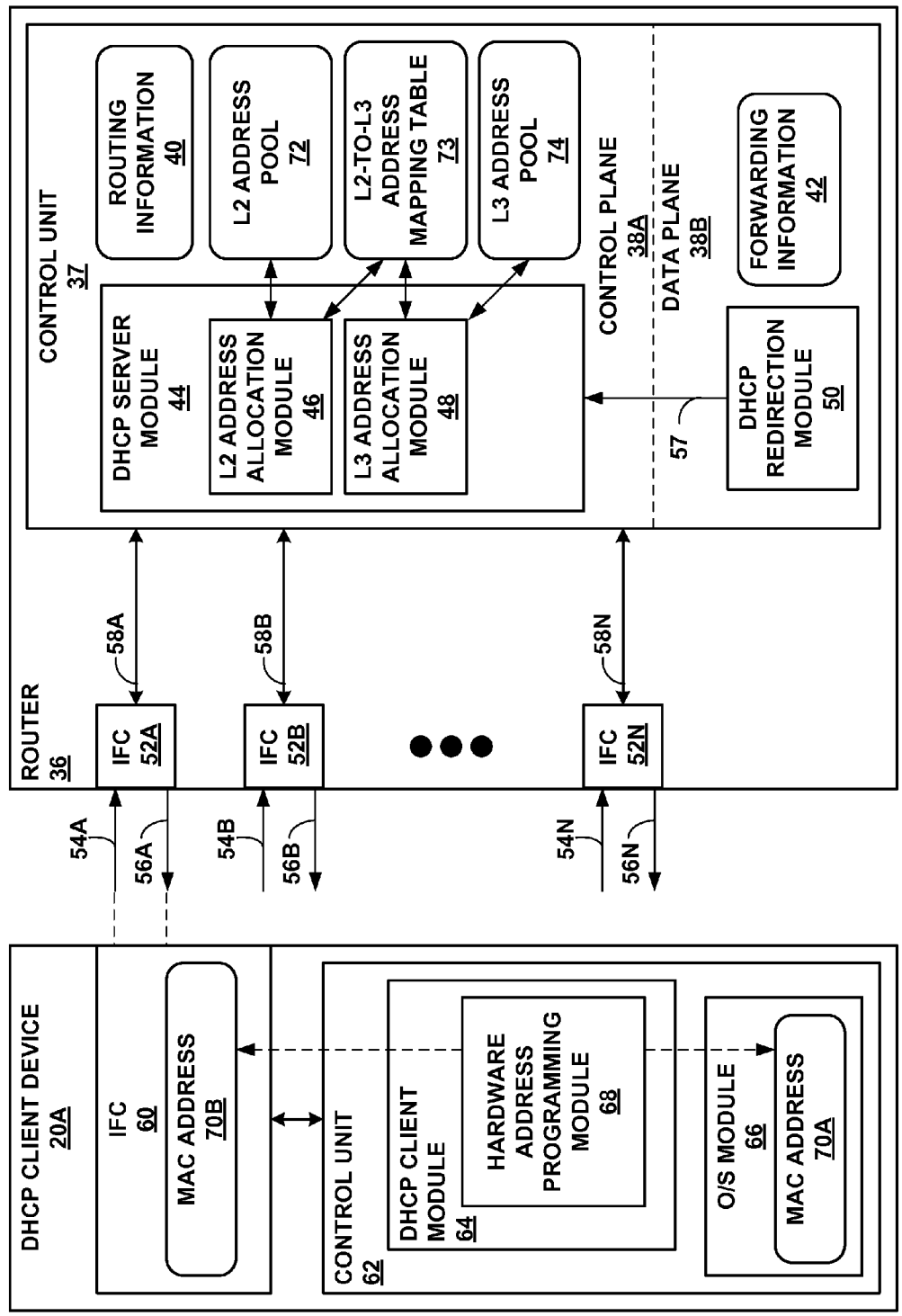
FIG. 2 is a block diagram illustrating the DHCP client device and the DHCP server in more detail.

FIG. 2 is a block diagram illustrating DHCP client device 20A and DHCP server 16, as represented by router 36, of FIG. 1 in more detail. As noted above, DHCP server 16 may be implemented by a network device, such as router 36 shown in FIG. 2, or any other network device capable of implementing DHCP, including a switch, a hub, a personal computer, a workstation, a laptop, and a stand-alone server. Router 36 may generally represent any network device that performs routing functions to route data units through a network. Router 36 may route particular types of data units referred to as packets and as a result may be referred to as a "packet-based router." Moreover, router 36 may implement layer 3 (L3) protocols or network layer protocols (where L3 refers to the L3 of the OSI model, as described above), such as an Internet Protocol (IP), and route packets according to layer 3 information. Consequently, router 36 may also be referred to as a "layer 3 router", a "network layer router" or an "IP router." Again, router 36 may represent an example embodiment of DHCP server 16 of FIG. 1. For purposes of illustration, router 36 may be described below within the context of exemplary network system 10 of FIG. 1.

As shown in FIG. 2, router 36 includes a control unit 37. Control unit 37 may include one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 37 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 37 may be divided into two logical or physical "planes" to include a first control or routing plane 38A and a second data or forwarding plane 38B. That is, control unit 37 may implement two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 38A of control unit 37 may execute the routing functionality of router 36. In this respect, control plane 38A may represent hardware and/or software of control unit 37 that implements routing protocols (not shown in FIG. 2) by which routing information 40 may be determined. Routing information 40 may include information defining a topology of a network, such as network 14. Control plane 38A may resolve the topology defined by routing information 40 to select or determine one or more routes through network 14. Control plane 38A may then update data plane 38B with these routes, where data plane 38B maintains these routes as forwarding information 42. Forwarding or data plane 38B may represent hardware and/or software of control unit 37 that forwards network traffic in accordance with forwarding information 42.

Control plane 38A may further comprise a DHCP server module 44 that implements DHCP in the manner described above with respect to DHCP server 16 of FIG. 1. In other words, DHCP server module 44 may receive DHCP messages, such as DHCP messages 24A, and 32A, and respond to these messages with DHCP messages 28A and 34A in the manner described above. DHCP server module 44 may include both a L2 address allocation module 46 and a L3 address allocation module 48. L2 address allocation module 46 may implement various aspects of the techniques described in this disclosure to allocate L2 hardware addresses for use by DHCP client devices, such as DHCP client device 20A. L3 address allocation module 48 represents a module that reserves and then assigns a lease for a L3 network to DHCP client devices, such as DHCP client device 20A.

Data plane 38B also includes a DHCP redirection module 50. DHCP redirection module 50 represents a module that inspects incoming network traffic to determine if this incoming network traffic represents DHCP messages. DHCP redirection module 50 may, in some instances, comprise a logic programmed within a forwarding ASIC or other component of data plane 38B that filters traffic based on headers of the incoming network traffic or any other similar mechanism that data plane 38B may employ to distinguish particular types of network traffic from other types of network traffic.

DHCP redirection module 50 may, for example, include one or more filters programmed within data plane 38B that listens on a one or more ports assigned for DHCP communications, e.g., ports 67 and 68. DHCP redirection module 50 often includes one filter that listens on these DHCP ports 67 and 68, and upon receiving traffic over these ports, determines an address to which the DHCP communications are transmitted. DHCP client devices 20 usually, as one example, transmit the DHCP messages by broadcasting these DHCP messages over one of the above ports. In these instances, DHCP redirection module 50 filters packets that indicate a broadcast address, e.g., an address of all ones, and designate one of the DHCP ports. DHCP redirection module 50 may therefore filter packets in this manner and forward DHCP messages 57 to control plane 38A of control unit 37.

As further shown in FIG. 2, router 36 includes interface cards (IFCs) 52A-52N ("IFCs 52") that receive and send packet flows or network traffic via inbound network links 54A-54N ("inbound network links 54") and outbound network links 56A-56N ("outbound network links 56"), respectively. Router 36 typically include a chassis (not shown in FIG. 2) having a number of slots for receiving a set of cards, including IFCs 52. Each card may be inserted into a corresponding slot of a chassis for communicably coupling the card to a control unit 37 via a bus, backplane, or other electrical communication mechanism. IFCs 52 are typically coupled to network links 54, 56 via a number of interface ports (not shown), and forward and receive packets and control information from control unit 37 via a respective one of paths 58A-58N ("paths 58"). Each physical interface of IFCs 52 is typically assigned a unique identifier by control unit 37, and multiple logical interfaces having unique identifiers may be assigned to each physical interface, where each logical interface represents as a distinct input or output interface for different network traffic. These logical interfaces may represent VLANs and each VLAN may be assigned a unique VLAN tag. Often, each particular context in which a DHCP client device resides is assigned a VLAN tag to differentiate between client devices of different context. Each of IFCs 52 may also each couple to a different separate sub-network via links 54, 56. These sub-networks, although not shown in FIGS. 1 and 2, may comprise a Large Area Network (LAN) or other broadcast network.

In the example of FIG. 2, IFC 52A is communicatively coupled to DHCP client device 20A, as illustrated by the dotted line from inbound network link 54A and outbound network link 56A. The dotted line denotes a communicative coupling and is not necessarily intended to suggest a direct or single link connection. A number of intervening devices may reside between DHCP client device 20A and router 36 which route or otherwise switch packets or any other type of data unit between DHCP client device 20A and router 36. The techniques should therefore not be limited in this respect to any specific arrangement of device 20A and router 36.

DHCP client device 20A includes an IFC 60 and a control unit 62. IFC 60 may be similar to IFCs 52 in function but are often scaled down in size and capacity to suit general consumer data requirements rather than enterprise or business data requirements. Control unit 62 may be similar to control unit 37 in that it includes one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 62, like control unit 37, may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 62 of DHCP client device 20A includes DHCP client module 64 and operating system module 66 ("O/S module 66"). DHCP client module 64 generally represents a module that implement DHCP to perform DHCP functions required by DHCP to secure a L3 network address for use by DHCP client device 20A. DCHP client module 64 includes a hardware address programming module 68 that represents a module for programming hardware addresses, which are then used in sending and receiving packets throughout network system 10 from and destined to DHCP client device 20A. Although shown as included within DHCP client module 64, this hardware address programming module 68 may be implemented either as a portion of DHCP client module 64 or as a module external to DHCP client module 64. Hardware address programming module 68 includes appropriate software interfaces and routings to reprogram the hardware address within circuitry of IFC 60. Hardware address programming module 64 may initiate reprogramming of the non-volatile memory, such as Flash™ memory, SRAM, EEPROM, or any other type of non-volatile memory, that stores MAC address 70B within IFC 60 by sending one or more signals to IFC 60. These signals may cause IFC 60 to flash or otherwise reprogram this non-volatile memory using integrated programming circuitry. The signals may also signal the replacement MAC address that this integrated programming circuitry uses to reprogram this non-volatile memory so that it stores the replacement MAC address. O/S module 66 represents any type of operating system typically executed by a control unit, such as control unit 62, to provide a platform on which software may execute to interface with hardware, such as IFC 60.

Initially, router 36 may receive network traffic via inbound network links 54 from a DHCP client device, such as DHCP client device 20A. In particular, IFC 52A coupled to respective inbound network link 54A may receive the network traffic from DHCP client device 20A. IFC 52A forwards this network traffic via path 58A to data plane 38B of control unit 37. DHCP redirection module 50 may then filter or otherwise perform operations to determine whether the incoming network traffic includes DHCP messages, such as DHCP messages 24-34. DHCP redirection module 50 may inspect the incoming network traffic and identify DHCP messages based on the format of DHCP messages, as set out in detail in the above incorporated RFC 2131. DHCP redirection module 50, upon detecting one or more DHCP message within the incoming network traffic, may forward the DHCP message to DHCP server module 44, where these messages are shown in FIG. 2 as DHCP messages 57.

As described above with respect to FIG. 1, router 36 may first receive a DHCP discover message, such as DHCP discover message 24A. DHCP redirection module 50 may detect or filter this message 24A and forward message 24A to DHCP server module 44 as one of DHCP messages 57. DHCP server module 44 receives DHCP discover message 24A and parses this message 24A in the manner described above to extract an indicator. This indicator may indicate whether or not DHCP client device 20A supports dynamic hardware address programming. For this reason, the indicator may be referred to as a "dynamic hardware address reprogramming indicator." DHCP client device 20A, or more specifically, DHCP client module 64 executing within control unit 62 populates the indicator in DHCP discover message 24A to indicate whether or not it includes hardware address programming module 68. In the example of FIG. 2, DHCP client module 64 includes hardware address programming module 68 and sets the indicator to indicate that DHCP client device 20A supports dynamic hardware address programming. As a result, DHCP server module 44 determines that DHCP client device 20A supports dynamic hardware address programming based on the indicator extracted from DHCP discover message 24A.

Based on this determination, DHCP server module 44 parses data from a hardware address field, referred to as a "chaddr" field in DHCP, within DHCP discover message 24A. Generally, there are two ways in which DHCP client device 20A derives a MAC address for use is populating the chaddr field. In one way, DHCP client module 64 derives its identifying MAC address from O/S module 66, which typically stores a MAC address 70A in a registry or other configuration file of O/S module 66. In another way, DHCP client module 64 derives its identifying MAC address from IFC 60, which generally stores a MAC address 70B in a non-volatile memory. When stored by O/S module 66, MAC address 70A may override or otherwise replace MAC address 70B stored by IFC 60. When O/S module 66 does not store MAC address 70A, DHCP client module 64 uses MAC address 70B. Regardless, DHCP client module 64 generates DHCP discover message 24A to specify either one of MAC addresses 70A, 70B ("MAC addresses 70") in the chaddr field of DHCP discover message 24A.

DHCP server module 44 uses this parsed one of MAC addresses 70 to perform a lookup in L2-to-L3 address mapping table 73 in order to determine whether this parsed one of MAC addresses 70 is already in use within a network that requires uniquely addressability with respect to L2 hardware addresses, which is represented by way of example in FIG. 1 as subnet 22. In particular, DHCP server module 44 invokes L2 address allocation module 46, which, in conjunction with L3 address allocation module 48, stores data defining L2-to-L3 address mapping table 73. L2-to-L3 address mapping table 73 includes entries, each of which defines a mapping between L2 hardware addresses and L3 network addresses. These entries are defined only for those client devices that have active leases for L3 network addresses and L3 address allocation module 48 is typically responsible for removing entries when a given lease for a L3 network address expires. In some instances, L2-to-L3 address mapping table 73 is organized such that it is divided by subnets, considering that unique L2 addressability is only required within a given subnet. In these instances, L2 address allocation module 46 may determine or otherwise derive the subnet from one or more options inserted by a relay device, such as DHCP relay device 12. When the DHCP server resides within the same subnet as that of the client devices, L2 address allocation module 46 generally need not determine the subnet.

In any event, L2 address allocation module 46 fails to retrieve an entry from L2-to-L3 address mapping table 73 when the parsed one of MAC addresses 70 is not already in use in subnet 22. Otherwise, L2 address allocation module 46 retrieves an entry from L2-to-L3 address mapping table 73 when the parsed one of MAC addresses 70 is already in use in subnet 22. If the lookup returns no entry, L2 address allocation module 46 may perform one of two operations. In some instances, L2 address allocation module 46 does not assign a new or replacement MAC address but adds an entry to L2-to-L3 address mapping table 73 indicating that the combination of the parsed one of MAC addresses 70 is currently in use by DHCP client device 20A within subnet 22. In other instances, L2 address allocation module 46 selects a replacement MAC address from L2 address pool 72 that is not currently in use by any other device within subnet 22, updates the entry corresponding to the new or replacement MAC address within L2-to-L3 address mapping table 73 to reflect its use by DHCP client device 20A and returns the replacement MAC address to DHCP server module 44. In some instances, L2 address allocation module 46 does not determine whether or not the parsed one of MAC addresses 70 is currently in use within subnet 22. Instead, L2 address allocation module 46 automatically selects a replacement MAC address for use by DHCP client device 20A in place of the extracted or parsed one of MAC addresses 70 regardless of whether or not the extracted or parsed one of MAC addresses 70 is in use within subnet 22.

Assuming the address is determined to be in use by another device within subnet 22 and L2 address allocation module 46 selects a replacement address from L2 address pool 72, DHCP server module 44 receives the replacement MAC address and generates DHCP offer message 28A. After invoking L2 address allocation module 46, DHCP server module 44 invokes L3 address allocation module 48 to select an IP address from L3 address pool 74, which stores data defining an IP address pool. When invoking L3 address allocation module 48, DHCP server module 44 passes the replacement MAC address to L3 address allocation module 48, which it uses to update the entry of L2-to-L3 address mapping table 73 associated with the replacement MAC address to reflect the use of the newly allocated IP address by DHCP client device 20A. L3 address allocation module 48 returns this IP address, which DHCP server module 44 uses to generate DHCP offer message 28A in conjunction with the replacement MAC address. DHCP server module 44 generates DHCP offer message 28A to include a new DHCP option, which may be referred to as a "new hardware address option," that stores the replacement MAC address.

As noted above, DHCP messages are broadcast to a certain extent through network system 10 rather than being individually switched to DHCP client devices and DHCP servers. For example, within subnet 22, DHCP messages are broadcast. However, DHCP relay device 12 may update DHCP messages so that these DHCP messages are directly routed to DHCP server 16 rather than broadcast these messages via network 14. Likewise, DHCP relay device 12 may address DHCP messages for direct delivery to DHCP relay device 12 rather than broadcast these messages throughout network 14, whereupon DHCP relay device 12 updates these messages so that these messages are broadcast throughout subnet 22. Considering that these messages are broadcast rather than directly addresses to the parsed one of MAC addresses 70, ensures that this message is delivered to the other DHCP client device within subnet 22 that uses the same MAC address as that parsed from DHCP discover message 24A. Consequently, both DHCP client devices that maintain the same MAC address receive this broadcast message and relying on a field referred to as an "XID" field, each of the DHCP client devices may properly resolve to which one of these devices the message was intended. The so-called "XID" field stores a random number selected by DHCP client device 20A and inserted into DHCP discover message 24A, which DHCP server module 44 extracts and returns it an "XID" field of DHCP offer message 28A. In this manner, messages 24, 28, 32, 34 may be properly received by DHCP client device 20A despite another DHCP client device using the same MAC address as that of the parsed on of MAC addresses 70 within subnet 22.

Upon receiving this DHCP offer message 28A, DHCP client module 64 extracts the replacement MAC address stored to the new hardware address option within DHCP offer message 28A. DHCP client module 64 invokes hardware address programming module 68 and passes this replacement MAC address to hardware address programming module 68, which proceeds to program this replacement MAC address in place of MAC address 70A and/or MAC address 70B. In some instances, hardware address programming module 68 updates both of MAC addresses 70. In other instances, hardware address programming module 68 only updates MAC address 70A if present, and if not present, only updates MAC address 70B. Regardless, hardware address programming module 68 replaces one or both of MAC addresses 70 with the replacement MAC address specified in DHCP offer message 28A.

After replacing, editing or otherwise reprogramming one or both of MAC addresses 70 with the replacement MAC address, DHCP client module 64 proceeds to respond to DHCP offer message 28A in one of two ways. In the first way, DHCP client module 64 generates a another DHCP discover message that is similar to DHCP discover message 24A except for DHCP client module 64 uses the replacement MAC address rather than the originally specified one of MAC addresses 70. Usually, DHCP client module 64 proceeds to respond to DHCP offer message 28A in this manner when relying on a client identifier option field to uniquely identify itself within subnet 22 rather than the source hardware address specified in the chaddr field. Upon forwarding this DHCP discover message, DHCP client module 64 restarts the process by which DHCP client module 64 requests a lease for an IP or other L3 network address. Router 36, which again represents DHCP server 16, receives this DHCP discover message and responds again most likely with the same lease for the same IP address as that offered in the previous DHCP offer message 28A, only DHCP server module 44 does not include a new or replacement MAC address in this message as it determines it has already performed this replacement by invoking L2 address allocation module 46.

In the second way, DHCP client module 64 generates a DHCP request message 32A using the replacement MAC address as represented by one or both of MAC addresses 70 (considering one or both of these has been previously reprogrammed with the replacement MAC address). In each of these two ways, DHCP server module 44 receives a DHCP request message 32A that specifies the identity of DHCP client device 20A using the new or replacement MAC address. DHCP server module 44 responds to this DHCP request message 32A with a DHCP ACK message 34A to acknowledge that the lease for the selected IP address has been reserved for use by DHCP client device 20A, as identified by the replacement MAC address.

Figure 3A:
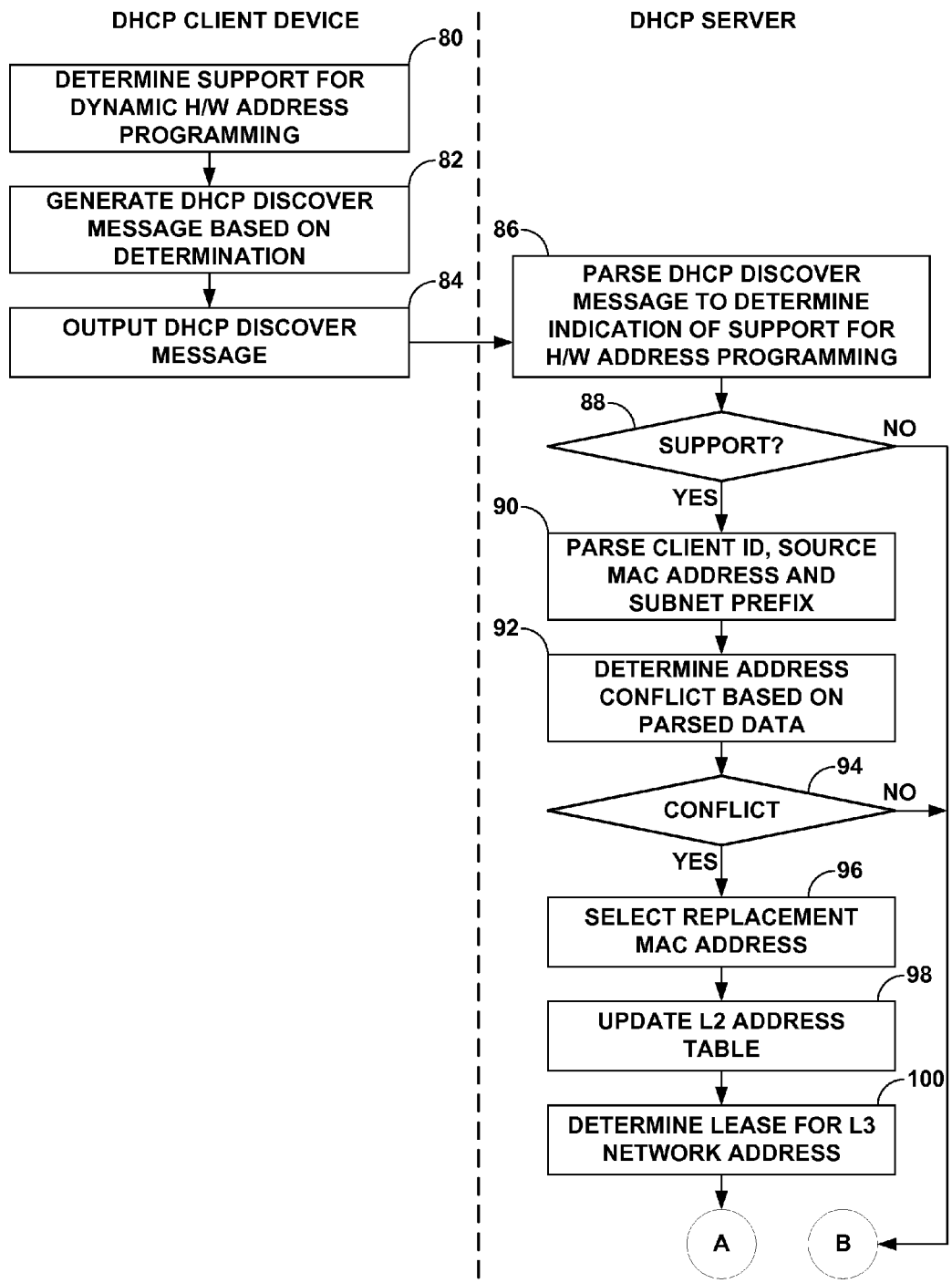
FIGS. 3A-3B are flowcharts illustrating example operation of DHCP client device and a DHCP server in implementing various aspects of the techniques described in this disclosure.
Figure 3B:
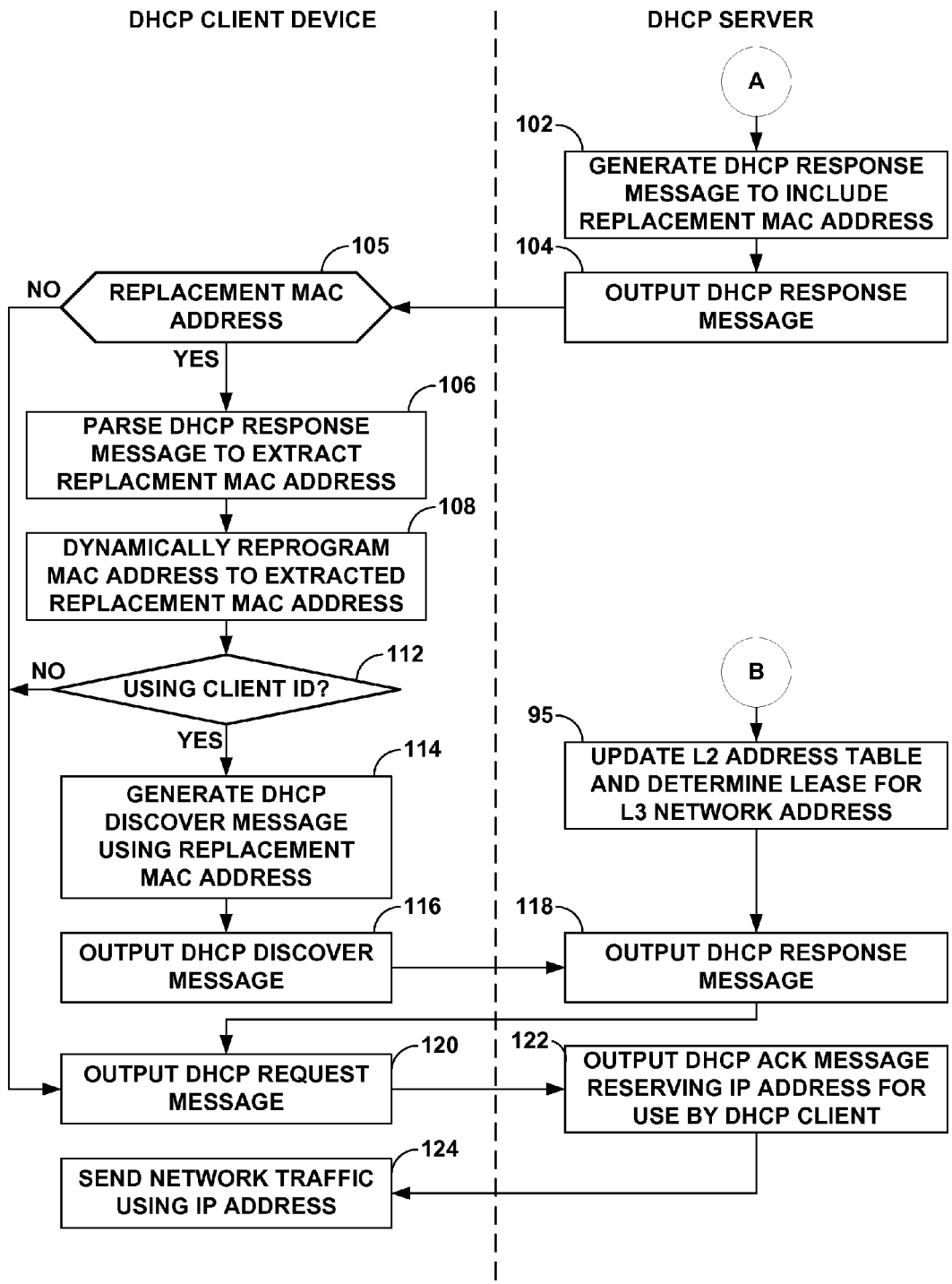

FIGS. 3A-3B are flowcharts illustrating example operation of DHCP client device, such as DHCP client device 20A of FIG. 2, and a DHCP server, such as router 16 shown in the example of FIG. 2 that represents DHCP server 16 shown in FIG. 1, in implementing various aspects of the techniques described in this disclosure. Referring first to FIG. 3A, DHCP client device 20A is initially configured in a manner to support the techniques described in this disclosure. That is, DHCP client device 20A may be upgraded with new DHCP client software that includes the hardware address programming module shown in the example of FIG. 2 as hardware address programming module 68. Alternatively, DHCP client device 20A may come pre-configured with hardware address programming module 68 and an administrator, user or other operator of DHCP client device 20A may enable or otherwise activate module 68 within DHCP client module 64. Once activated or otherwise enabled, DHCP client device 20A may, upon being powered up or otherwise enabled or when enabling IFC 60, invoke DHCP client module 64 to secure a lease for a L3 network address for use by IFC 60 when communicating packets in network system 10.

Once invoked, DHCP client module 64 determines whether it supports hardware (H/W) address programming (80). For example, DHCP client module 64 may determine whether it includes hardware address programming module 68 and if so whether hardware address programming module 68 has been enabled or otherwise activated. DHCP client module 64 generates DHCP discover message 24A based on this determination, where this DHCP discover message 24A includes the above described indicator that indicates DHCP client module 64 supports dynamic hardware address programming or reprogramming in instances where DHCP discover message determines it supports dynamic hardware address programming (82). If DHCP client module 64 determines it does not support dynamic hardware address reprogramming, DHCP client module 64 generates DHCP discover message 24A such that DHCP discover message 24A either specifies no indicator or specifies the indicator such that it indicates DHCP client module 64 does not support dynamic hardware address reprogramming. In any event, DHCP client module 64 outputs DHCP discover message 24A such that DHCP server module 44 receives this message 24A in this example (84).

DHCP server module 44 parses DHCP discover message 24A to determine the indication of support for hardware (H/W) address programming in the manner described above (86). If the parsed indicator indicates support ("YES" 88), DHCP server module 44 parses a MAC address and determines a subnet prefix from DHCP discover message 24A, as described above (90). Next, DHCP server module 44 invokes L2 address allocation module 46, passing the parsed information noted above. L2 address allocation module 46 first determines if there is an address conflict by performing a lookup in L2-to-L3 address mapping table 73 using the parsed subnet prefix to locate the proper portion of table 73 and the parsed source MAC address to determine if another device is currently using that same MAC address within the same subnet (92). If an address conflict is identified or determined ("YES" 94), L2 address allocation module 46 selects a replacement MAC address for use by DHCP client device 20A from L2 address pool 72 and updates L2-to-L3 address mapping table 73 to reflect use of this replacement MAC address by DHCP client device 20A within subnet 22 identified by the parsed subnet prefix (96, 98). If no address conflict is identified or determined ("NO" 94), L2 address allocation module 46 updates L2-to-L3 address mapping table 73 to add a new entry associated with the parsed subnet prefix that indicates use of the parsed MAC address within subnet 22 identified by the parsed subnet prefix and DHCP server module 44 also invokes L3 address allocation module 48 to secure a lease for one of the IP address specified in L3 address pool 74 (FIG. 3B, 95).

Referring to FIG. 3B and assuming for purposes of illustration that a replacement hardware or MAC address was required, DHCP server module 44 generates a DHCP offer message 28A that includes the replacement MAC address in a new DHCP option field and outputs this DHCP offer message 28A such that DHCP client module 64 receives this message 28A (102, 104). Upon receiving DHCP offer message 28A, DHCP client module 64 first determines DHCP offer message 28A includes a MAC address (105). In this instance, DHCP offer message 28A includes a MAC address and DHCP client module 64 determines that DHCP offer message 28A includes a MAC address ("YES" 105). If, however, DHCP client module 64 determines that DHCP offer message 28A does not include a MAC address ("NO" 105), DHCP client module 64 generates and outputs a DHCP request message in accordance with conventional DHCP techniques.

In any event, in response to this determination that DHCP offer message 28A includes a replacement MAC address, DHCP client module 64 parses DHCP offer message 28A, which is in response to DHCP discover message 24A and therefore may be considered a DHCP response message, to extract the replacement MAC address in the manner described above (106). In response to detecting and then extracting this replacement MAC address, DHCP client module 64 invokes hardware address programming module 68 to dynamically reprogram either or both of MAC addresses 70 to the extracted replacement MAC address, again as described above (108). DHCP client module 64 then determines whether it is using the client ID option to identify itself to DHCP server module 44 (112). If using the client ID option to identify itself, DHCP client module 64 generates a new DHCP discover message (which is not shown in the example of FIG. 1) using the replacement MAC address, which is now stored to either or both of MAC addresses 70, and outputs this new DHCP discover message (114, 116). Alternatively, DHCP client module 64, even if using the client ID option to identify itself, generates a DHCP request message specifying the new replacement MAC address in the chaddr field without issuing a new DHCP discover message. Assuming DHCP client module 64 generates and outputs new DHCP discover message, DHCP server module 44 responds to this new DHCP discover message with another DHCP offer message (118). Moreover, if DHCP server module 44 determines from the parsed indicator that DHCP client device 20A does not support dynamic hardware programming ("NO" 88), DHCP server module 44 updates L2 address table, determines a lease for a L3 network address and otherwise responds with a DHCP offer message in the conventional way (95, 118).

If not using the client ID option to identify itself ("NO" 112) or if using the client ID and after sending the new DHCP discover message using the replacement MAC address or if no conflict was detected, DHCP client module 64 generates a DHCP request message 32A either after receiving the replacement MAC address or after receiving the DHCP offer message or after determining no conflict was detected, respectively (120). DHCP server module 44 then outputs a DHCP ACK message 34A reserving an IP address for use by DHCP client device 20A, which DHCP client device 20A receives and uses to send network traffic (122, 124).

Figure 4A:
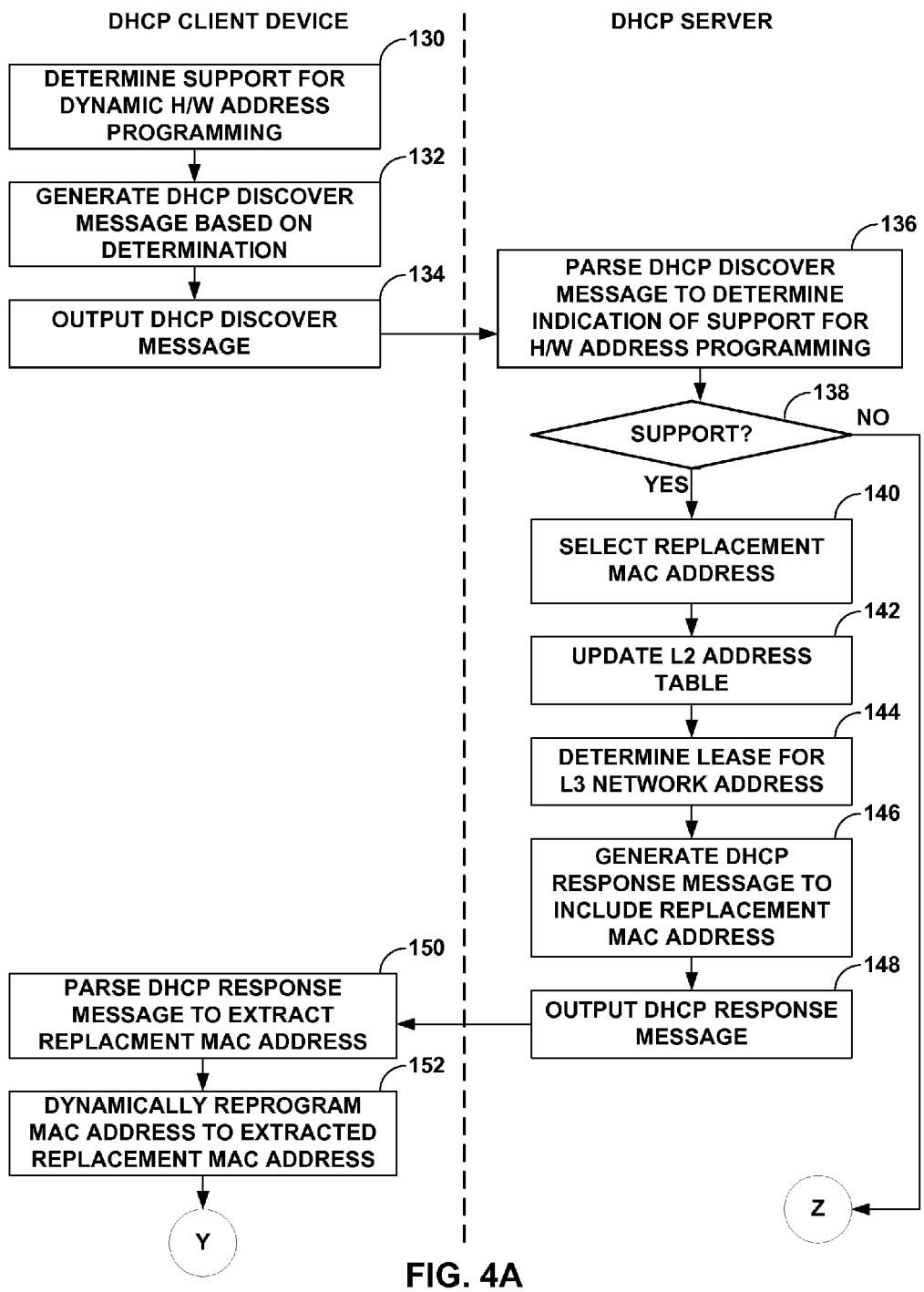
FIGS. 4A-4B are flowcharts illustrating another example operation of DHCP client device and a DHCP server in implementing various aspects of the techniques described in this disclosure.
Figure 4B:
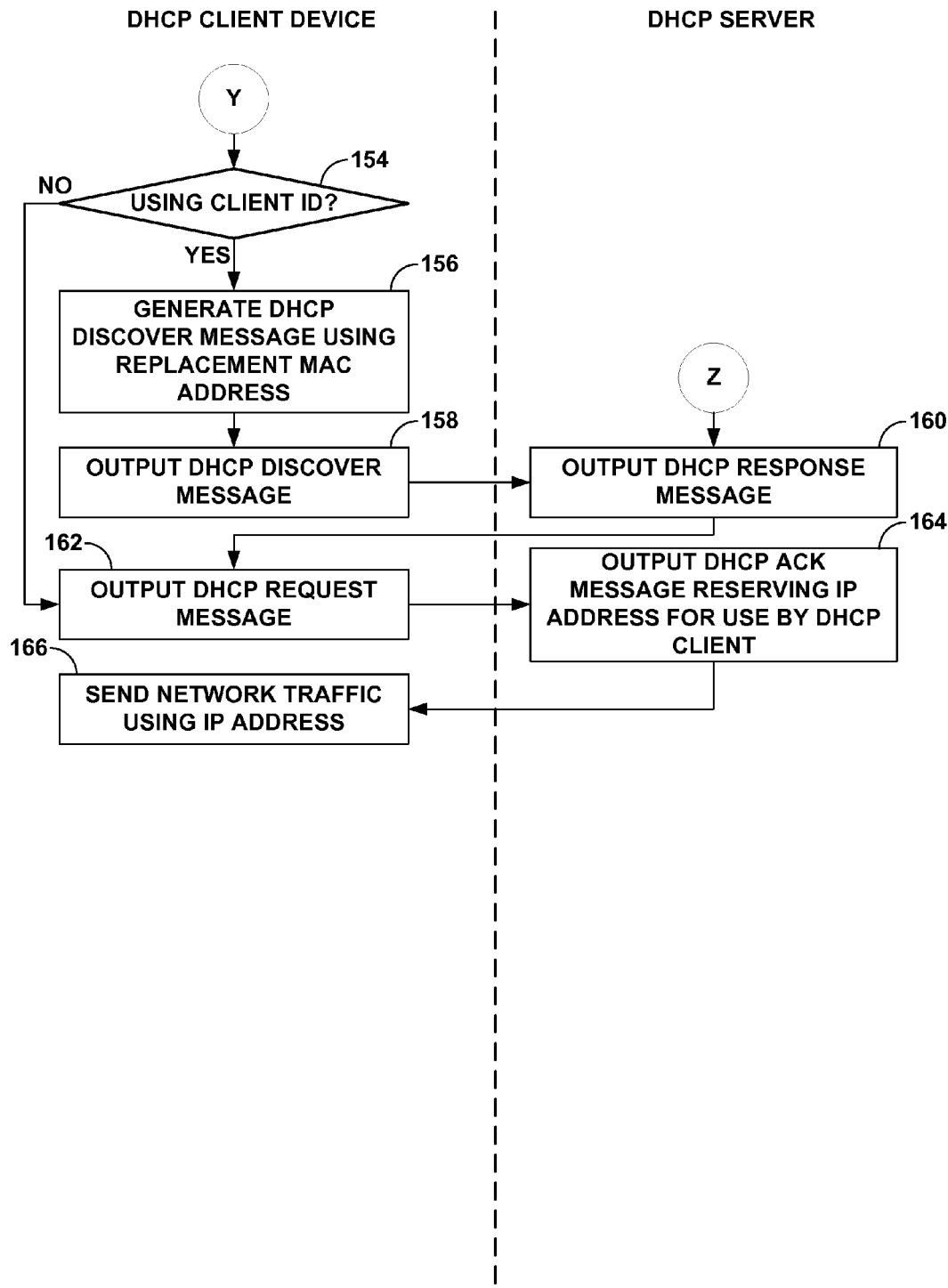

FIGS. 4A-4B are flowcharts illustrating another example operation of DHCP client device, such as DHCP client device 20A of FIG. 2, and a DHCP server, such as router 16 that represents DHCP server 16 shown in FIG. 1, in implementing various aspects of the techniques described in this disclosure. Referring first to FIG. 4A, DHCP client device 20A is initially configured in a manner to support the techniques described in this disclosure. That is, DHCP client device 20A may be upgraded with new DHCP client software that includes the hardware address programming module shown in the example of FIG. 2 as hardware address programming module 68. Alternatively, DHCP client device 20A may come preconfigured with hardware address programming module 68 and an administrator, user or other operator of DHCP client device 20A may enable or otherwise activate module 68 within DHCP client module 64. Once activated or otherwise enabled, DHCP client device 20A may, upon being powered up or otherwise enabled or when enabling IFC 60, invoke DHCP client module 64 to secure a lease for a L3 network address for use by IFC 60 when communicating packets in network system 10.

Once invoked, DHCP client module 64 determines whether it supports hardware (H/W) address programming (130). For example, DHCP client module 64 may determine whether it includes hardware address programming module 68 and if so whether hardware address programming module 68 has been enabled or otherwise activated. DHCP client module 64 generates DHCP discover message 24A based on this determination, where this DHCP discover message 24A includes the above described indicator that indicates DHCP client module 64 supports dynamic hardware address programming or reprogramming in instances where DHCP discover message determines it supports dynamic hardware address programming (132). If DHCP client module 64 determines it does not support dynamic hardware address reprogramming, DHCP client module 64 generates DHCP discover message 24A such that DHCP discover message 24A either specifies no indicator or specifies the indicator such that it indicates DHCP client module 64 does not support dynamic hardware address reprogramming. In any event, DHCP client module 64 outputs DHCP discover message 24A such that DHCP server module 44 receives this message 24A in this example (134).

DHCP server module 44 parses DHCP discover message 24A to determine the indication of support for hardware (H/W) address programming in the manner described above (136). If the parsed indicator indicates support ("YES" 140), L2 address allocation module 46 selects a replacement MAC address for use by DHCP client device 20A from L2 address pool 72 and updates L2-to-L3 address mapping table 73 to reflect use of this replacement MAC address by DHCP client device 20A within subnet 22 identified by a parsed subnet prefix (140, 142). DHCP server module 44 also invokes L3 address allocation module 48 to secure a lease for one of the IP address specified in L3 address pool 74 (144). DHCP server module 44 generates a DHCP offer message 28A that includes the replacement MAC address in a new DHCP option field and outputs this DHCP offer message 28A, which again may represent one type of DHCP response message, such that DHCP client module 64 receives this message 28A (146, 148). Upon receiving DHCP offer message 28A, DHCP client module 64 parses DHCP offer message 28A to extract the replacement MAC address in the manner described above (150). In response to detecting and then extracting this replacement MAC address, DHCP client module 64 invokes hardware address programming module 68 to dynamically reprogram either or both of MAC addresses 70 to the extracted replacement MAC address, again as described above (152).

Referring to FIG. 4B, DHCP client module 64 then determines whether it is using the client ID option to identify itself to DHCP server module 44 (154). If using the client ID option to identify itself, DHCP client module 64 generates a new DHCP discover message (which is not shown in the example of FIG. 1) using the replacement MAC address, which is now stored to either or both of MAC addresses 70, and outputs this new DHCP discover message (156, 158). The alternative also applies in this instance where DHCP client module 64 does not restart with a new DHCP discover message but generates and outputs a DHCP request message having the new replacement MAC address and the client ID specified. Assuming a new discover message was sent, DHCP server module 44 responds to this new DHCP discover message with another DHCP response message (160). Moreover, if DHCP server module 44 determines from the parsed indicator that DHCP client device 20A does not support dynamic hardware programming ("NO" 138), DHCP server module 44 responds with a DHCP response message (160).

If not using the client ID option to identify itself ("NO" 154) or if using the client ID and after sending the new DHCP discover message using the replacement MAC address, DHCP client module 64 generates a DHCP request message 32A either after receiving the replacement MAC address or after receiving the DHCP offer message, respectively (162). DHCP server module 44 then outputs a DHCP ACK message 34A reserving an IP address for use by DHCP client device 20A, which DHCP client device 20A receives and uses to send network traffic (164, 166).

Figure 5:
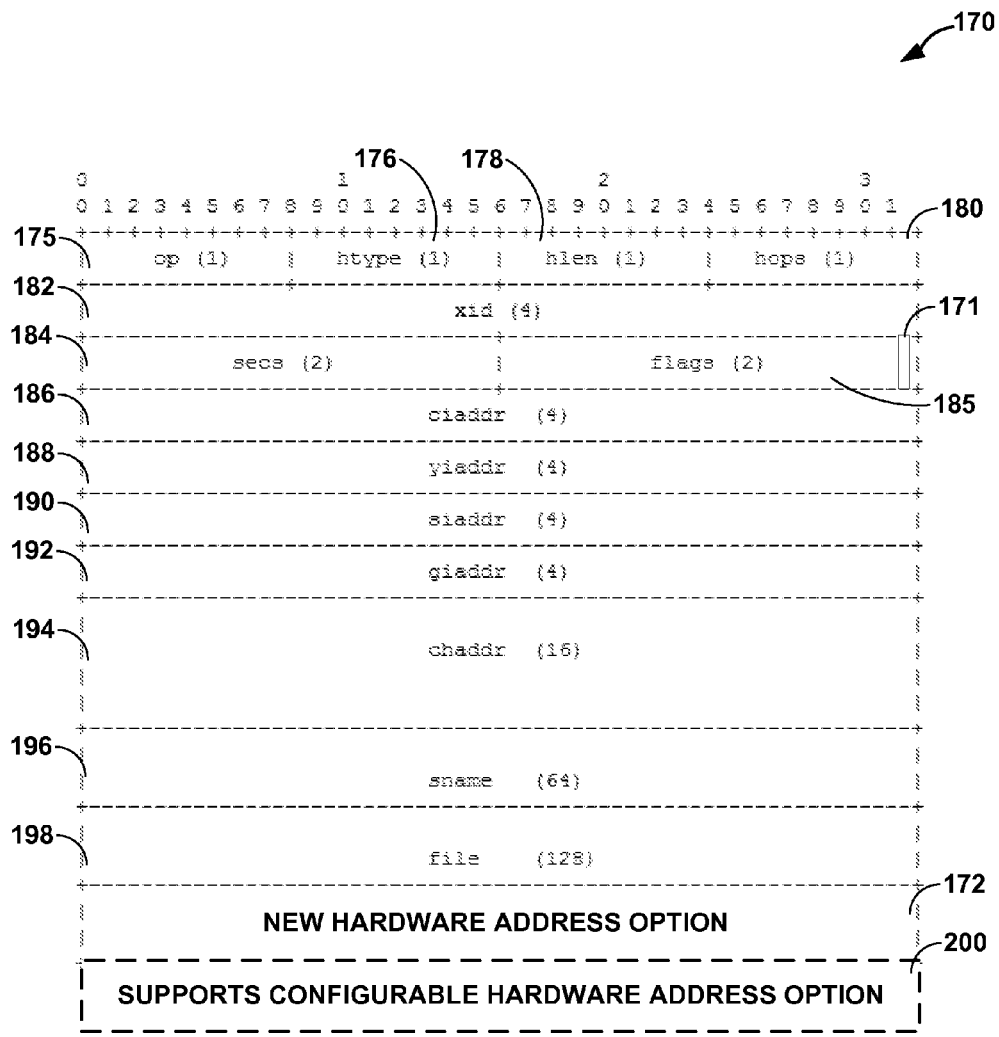
FIG. 5 is an illustration showing an exemplary format for a DHCP message specifying a new indicator field and a new hardware address option field in accordance with the techniques described in this disclosure.

FIG. 5 is an illustration showing an exemplary format for a DHCP message 170 specifying a new indicator field 171 and a new hardware address option field 174 in accordance with the techniques described in this disclosure. DHCP message 170 also includes an opcode ("op") field 175 that identifies the type of message (e.g., a discover, offer, request, ack, etc. message), a hardware address type ("htype") field 176, a hardware address length ("hlen") field 178, a hops field 180 identifying a number of hops between the client and the server, an xid field 182 that specifies a transaction ("x")_ identifier ("id") as the above noted random number chosen by the client, a seconds ("secs") field 184 that defines the seconds elapsed since the client began address acquisition or renewal process, a flags field 185, a client IP address ("ciaddr") field 186 (which is only filled in if the client is in bound, renew or rebinding state), a your IP address ("yiaddr") field 188, a server IP address ("siaddr") field 190, a relay agent IP address ("giaddr") field 192, a client hardware address ("chaddr") field 194, an optional server host name ("sname") field 196, and a boot file name ("file") field 198. Indicator 171 is shown in the example of FIG. 5 to be included within flags field 185, while the new hardware address option field 174 follows at the end of DHCP message in an optional options section of DHCP message 170. As an alternative to indicator 171, DHCP message 170 may include another option referred to as a "Supports Configurable Hardware Address" option 200 in FIG. 5 that is used in place of the indicator to indicate support for the techniques described in this disclosure.

While described in this disclosure with respect to DHCP version four ("DHCPv4"), the techniques may be implemented with respect to any other protocol capable of defining similar options or type-length-value fields, including a new version of DHCP referred to as DHCP for IPv6 ("DHCPv6"). When implemented with respect to DHCPv6, DHCP clients are identified by a DHCP unique identifier (DUID), which may store the MAC address. Hardware address programmable or configurable capable DHCP clients may, in this example, send their hardware address as one of the options in a DHCPv6 solicit message, where DHCPv6 servers may, if these servers decide to force the client to use a different hardware address, send the replacement hardware address in a new hardware address option in a DHCPv6 advertize message along with the DHCPv6 IP address. More information regarding DHCPv6 can be found in RFC 3315, entitled "Dynamic Host Configuration Protocol for IPv6 (DHCPv6), dated July 2003, which is hereby incorporated by reference as if set forth in its entirety herein. Moreover, the techniques described in this disclosure may apply to any protocol or other mechanism by which network device configuration information is provided to network devices so that these network devices may access a computer network.

Moreover, the techniques described above may be adapted to dynamically assign hardware addresses, such as MAC addresses, to DHCP client devices having interfaces that have not been initialized with a MAC address by the manufacture. In these instances, DHCP client devices 20 may generate DHCP messages having null, void, or random MAC address specified in chaddr field 194. The MAC address may be random in that the Flash or other memory in which this MAC address is supposed to be stored has not yet been initialized. In this sense, the null, void or random MAC address value may indicate that this MAC address has not yet been programmed, or in some instances, initialized. Rather than rely on a MAC address, the DHCP client devices may utilize other data, such as random number stored to an XID within each DHCP message, to identify whether or not DHCP messages from the DHCP server are intended for the DHCP client device. Alternatively, some version of DHCP or other network configuration protocols may not provide any field for storing a hardware address, where other fields may uniquely identify the device within the L2 portion of the network. To the extent these other fields may uniquely identify the device within the L2 portion of the network, these other one or more fields may represent a L2 hardware addresses.

Regardless, in response to detecting this null or void MAC address or a null or void data stored to these other fields, the DHCP server may implement the techniques described above to dynamically assign a MAC address in much the same manner that it assigns L3 network addresses. In this respect, hardware addresses may be dynamically provisioned within the network so as to avoid instances where two or more interfaces of different client devices are programmed to use the same hardware address.

In some instances, even though DHCP client devices 20 may indicate they do not support the techniques described in this disclosure or otherwise fail to indicate their support for these techniques, DHCP server 16 may still determine whether the MAC address specified in the DHCP discover message is unique within subnet 22 and provide the replacement MAC address in the manner described above. DHCP client devices 20 may, in response to detecting this replacement MAC address, present a warning or other indication to a user of DHCP client device 20 indicating that the user should manually reprogram the MAC address to the replacement MAC address. In this way, DHCP client devices 20 may not require new DHCP software, modules or unit that incorporate or that are otherwise capable of interfacing with a hardware address programming module, such as hardware address programming module 68 shown in the example of FIG. 2.

Various embodiments of the techniques have been described. These and other embodiments are within the scope of the following claims.

The invention claimed is:

1. A network device, comprising:
a physical network interface that receives a first message from a client device of a network, wherein the first message requests that a layer three (L3) network address be reserved for use by the client device, and wherein the first message also includes a layer two (L2) hardware address associated with a physical network interface of the client device, and wherein the first message specifies an indication of whether the client device supports automatic reconfiguration of the L2 hardware address associated with the network interface of the client device;
a control unit that determines, based on the indication, whether the client device supports automatic reconfiguration of the L2 hardware address associated with the network interface of the client device,
wherein the control unit, responsive to determining the client device supports automatic reconfiguration of the L2 hardware address associated with the network interface of the client device:
selects a replacement L2 hardware address to associate with the network interface of the client device as a replacement for the L2 hardware address included in the first message;
generates a second message having a field that specifies the replacement L2 hardware address; and
outputs, by the physical network interface of the network device, the second message to the client device in response to the first message so as to automatically associate the replacement L2 hardware address with the network interface of the client device.

2. The network device of claim 1,
wherein the first message comprises a dynamic host configuration protocol (DHCP) discover message, and
wherein the second message comprises a DHCP offer message having a type-length-value (TLV) field that specifies the replacement L2 hardware address.

3. The network device of claim 1,
wherein the network interface, after outputting the second message, receives a third message from the client device requesting that a layer three (L3) network address be reserved for the client device, wherein the third message includes the replacement L2 hardware address to identify the same network interface of the client device as that identified previously by the L2 hardware address in the first message,
wherein the control unit includes a server module that generates a fourth message that does not include the field specifying the replacement L2 hardware address, wherein the fourth message proposes a lease for a L3 network address, and
wherein the network interface outputs the fourth message to the client device in response to the third message.

4. The network device of claim 3,
wherein the first message comprises a dynamic host configuration protocol (DHCP) discover message,
wherein the second message comprises a DHCP offer message having a type-length-value (TLV) field that specifies the replacement L2 hardware address,
wherein the third message comprises another DHCP discover message that includes one or more of a client identifier option and an address field that specifies the replacement L2 hardware address, and
wherein the fourth message comprises another DHCP offer message that proposes the lease for the L3 network address.

5. The network device of claim 1,
wherein the control unit, responsive to determining the client device does not support automatic reconfiguration, denies the client device access to the network.

6. The network device of claim 1,
wherein the client device comprises a first client device,
wherein the control unit includes a server module comprising a L2 address allocation module that determines whether the L2 hardware address included in the first message is currently in use by a second client device, and
wherein the L2 address allocation module selects, based on the determination, a replacement L2 hardware address to associate with the network interface of the first client device as a replacement for the L2 hardware address included in the first message.

7. The network device of claim 1,
wherein the control unit includes a server module that stores data defining a layer two (L2) hardware address pool, wherein the L2 hardware address pool represents a set of L2 hardware addresses for use in the network by one or more client devices and stores data defining a layer three (L3) network address pool, wherein the L3 network address pool represents a set of L3 network addresses for use in the network by the one or more client devices,
wherein the server module includes a L2 address allocation module that selects the replacement L2 hardware address from the L2 hardware address pool, and
wherein the server module also includes a L3 address allocation module that selects a L3 network address from the L3 hardware address pool for use by the client device in the network, and
wherein the server module generates the second message that additionally proposes a lease for the selected L3 network device in conjunction with having the field that specifies the replacement L2 hardware address.

8. The network device of claim 1,
wherein the network device comprise either a router that implements a dynamic host configuration protocol (DHCP) server or a stand-alone DHCP server, and
wherein the client device comprises one or more of a personal computer, a laptop computer, a workstation, a cellular phone, a personal digital assistant (PDA), and a netbook.

9. The network device of claim 1, wherein the client device dynamically programs the client device so that the network interface uses the replacement L2 hardware address in place of the L2 hardware address specified in the first message.

10. The network device of claim 1,
wherein the L2 hardware address specified in the first message comprises a null L2 hardware address that specifies the client device supports automatic reconfiguration of the L2 hardware address associated with the network interface of the client device, and
wherein the control unit, determines whether the client device supports automatic reconfiguration of the L2 hardware address associated with the network interface of the client device by determining whether the L2 hardware address specified in the first message comprises the null L2 hardware address.

11. The network device of claim 1, wherein the first and second messages each conform to either a dynamic host configuration protocol (DHCP) for Internet protocol (IP) version four (DHCPv4) or a DHCP for IP version six (DHCPv6).

12. A method comprising:
receiving, with a network device of a network, a first message from a client device of the network, wherein the first message requests that a layer three (L3) network address be reserved for use by the client device, and wherein the first message includes a layer two (L2) hardware address associated with a physical network interface of the client device, and wherein the first message specifies an indication of whether the client device supports automatic reconfiguration of the L2 hardware address associated with the network interface of the client device;
determining, with the network device and based on the indication, whether the client device supports automatic reconfiguration of the L2 hardware address associated with the network interface of the client device; and
responsive to determining the client device supports automatic reconfiguration of the L2 hardware address associated with the network interface of the client device:
selecting, with the network device, a replacement L2 hardware address to associate with the network interface of the client device as a replacement for the L2 hardware address included in the first message;
generating, with the network device, a second message having a field that specifies the replacement L2 hardware address; and
outputting, with the network device, the second message to the client device in response to the first message so as to automatically associate the replacement L2 hardware address with the network interface of the client device.

13. The method of claim 12, further comprising:
after outputting the second message, receiving a third message from the client device requesting that a layer three (L3) network address be reserved for the client device, wherein the third message includes the replacement L2 hardware address to identify the same network interface of the client device as that identified previously by the L2 hardware address in the first message;
generating a fourth message that does not include the field specifying the replacement L2 hardware address, wherein the fourth message proposes a lease for a L3 network address; and
outputting the fourth message to the client device in response to the third message.

14. The method of claim 13,
wherein the first message comprises a dynamic host configuration protocol (DHCP) discover message,
wherein the second message comprises a DHCP offer message having a type-length-value (TLV) field that specifies the replacement L2 hardware address,
wherein the third message comprises another DHCP discover message that includes one or more of a client identifier option and an address field that specifies the replacement L2 hardware address, and
wherein the fourth message comprises another DHCP offer message that proposes the lease for the L3 network address.

15. The method of claim 12, further comprising:
responsive to determining the client device does not support automatic reconfiguration, denying the client device access to the network.

16. The method of claim 12,
wherein the client device comprises a first client device,
wherein the method further comprises determining whether the L2 hardware address included in the first message is currently in use by a second client device, and
wherein selecting a replacement L2 hardware address includes selecting, based on the determination, a replacement L2 hardware address to associate with the network interface of the first client device as a replacement for the L2 hardware address included in the first message.

17. The method of claim 12,
wherein the first message comprises a dynamic host configuration protocol (DHCP) discover message, and
wherein the second message comprises a DHCP offer message having a type-length-value (TLV) field that specifies the replacement L2 hardware address.

18. The method of claim 12, further comprising:
storing data defining a layer two (L2) hardware address pool, wherein the L2 hardware address pool represents a set of L2 hardware addresses for use in the network by one or more client devices;
storing data defining a layer three (L3) network address pool, wherein the L3 network address pool represents a set of L3 network addresses for use in the network by the one or more client devices,
wherein selecting the replacement L2 hardware address to associate with the network interface of the client device comprises selecting the replacement L2 hardware address from the L2 hardware address pool; and
selecting a L3 network address from the L3 hardware address pool for use by the client device in the network,
wherein generating a second message comprises generating the second message that additionally proposes a lease for the selected L3 network device in conjunction with having the field that specifies the replacement L2 hardware address.

19. The method of claim 12,
wherein the network device comprise either a router that implements a dynamic host configuration protocol (DHCP) server or a stand-alone DHCP server, and wherein the client device comprises one or more of a personal computer, a laptop computer, a workstation, a cellular phone, a personal digital assistant (PDA), and a netbook.

20. The method of claim 12, further comprising dynamically programming, with the client device, the client device so that the network interface uses the replacement L2 hardware address in place of the L2 hardware address specified in the first message.

21. The method of claim 12,
wherein the L2 hardware address specified in the first message comprises a null L2 hardware address that specifies the client device supports automatic reconfiguration of the L2 hardware address associated with the network interface of the client device, and
wherein determining, with the network device and based on the indication, whether the client device supports automatic reconfiguration of the L2 hardware address associated with the network interface of the client device comprises determining whether the L2 hardware address specified in the first message comprises the null L2 hardware address.

22. The method of claim 12, wherein the first and second messages each conform to either a dynamic host configuration protocol (DHCP) for Internet protocol (IP) version four (DHCPv4) or a DHCP for IP version six (DHCPv6).

23. A method comprising:
generating, with a client device located in a sub-network (subnet) of a network, a first message requesting that a layer three (L3) network address be reserved for use by the client device in the network, wherein the first message includes a layer two (L2) hardware address associated with a physical network interface of the client device, and wherein the first message specifies an indication of whether the client device supports automatic reconfiguration of the L2 hardware address associated with the network interface of the client device;
outputting, with the client device, the first message to a network device responsible for allocating leases for L3 network addresses to client devices;
receiving, with the client device, a second message having a field that specifies a replacement L2 hardware address for use in the network as a replacement for the L2 hardware address included in the first message; and
automatically replacing, with the client device, the L2 hardware address associated with the network interface of the client device with the replacement L2 hardware address specified in the second message.

24. The method of claim 23, wherein the indication indicates the client device supports automatic reconfiguration of the L2 hardware address associated with the network interface of the client device.

25. The method of claim 24,
wherein the indication indicates that the client device does not support automatic reconfiguration of the L2 hardware address, and
wherein receiving the second message comprises receiving the second message that does not have the field that specifies the replacement L2 hardware address as a result of the indication indicating that the client device does not support automatic reconfiguration of the L2 hardware address.

26. The method of claim 23, further comprising:
after receiving the second message, generating a third message requesting that a layer three (L3) network address be reserved for the client device, wherein the third message includes the replacement L2 hardware address to identify the same network interface of the client device as that identified previously by the L2 hardware address in the first message;
outputting the third message to the network device; and
receiving a fourth message in response to the third message, wherein the fourth message does not include the field specifying the replacement L2 hardware address, and wherein the fourth message proposes a lease for a L3 network address.

27. The method of claim 26,
wherein the first message comprises a dynamic host configuration protocol (DHCP) discover message,
wherein the second message comprises a DHCP offer message having a type-length-value (TLV) field that specifies the replacement L2 hardware address,
wherein the third message comprises another DHCP discover message that includes a client identifier option that specifies the replacement L2 hardware address, and
wherein the fourth message comprises another DHCP offer message that proposes the lease for the L3 network address.

28. The method of claim 23,
wherein the first message comprises a dynamic host configuration protocol (DHCP) discover message, and
wherein the second message comprises a DHCP offer message having a type-length-value (TLV) field that specifies the replacement L2 hardware address.

29. The method of claim 23,
wherein the network device comprises either a router that implements a dynamic host configuration protocol (DHCP) server or a stand-alone DHCP server, and
wherein the client device comprises one or more of a wireless access point (WAP), a computer, a laptop, a netbook, a portable device, a wireless handset, a personal digital assistant (PDA), a workstation, an Internet-capable appliance, an Internet-capable television, a printer, a server, a hub, and a switch.

30. The method of claim 23, wherein the layer two (L2) hardware address included within the first message comprises a null L2 hardware address to indicate the client device supports automatic reconfiguration of the L2 hardware address associated with the network interface of the client device.

31. The method of claim 23, wherein the first and second messages each conform to either a dynamic host configuration protocol (DHCP) for Internet protocol (IP) version four (DHCPv4) or a DHCP for IP version six (DHCPv6).

32. A client device comprising:
a physical network interface; and
a control unit that generates a first message requesting that a layer three (L3) network address be reserved for use by the client device in the network, wherein the control unit generates the first message to specify a layer two (L2) hardware address associated with the network interface and to specify an indication of whether the client device supports automatic reconfiguration of the L2 hardware address associated with the network interface;
wherein the network interface outputs the first message to a network device responsible for allocating leases for L3 network addresses to client devices and receives a second message having a field that specifies a replacement L2 hardware address for use in the network as a replacement for the L2 hardware address included in the first message, and
wherein the control unit outputs one or more signals to the physical network interface to automatically replace the L2 hardware address currently assigned to the network interface with the replacement L2 hardware address specified in the second message.

33. The client device of claim 32, wherein the indication indicates the client device supports automatic reconfiguration of the L2 hardware address associated with the network interface of the client device.

34. The client device of claim 33,
wherein the indication indicates that the client device does not support automatic reconfiguration of the L2 hardware address, and
wherein the network interface receives the second message that does not have the field that specifies the replacement L2 hardware address as a result of the indication indicating that the client device does not support automatic reconfiguration of the L2 hardware address.

35. The client device of claim 32,
wherein the control unit includes a client module that, after receiving the second message, generates a third message requesting that a layer three (L3) network address be reserved for the client device, wherein the third message includes the replacement L2 hardware address to identify the same network interface of the client device as that identified previously by the L2 hardware address in the first message, and
wherein the network interface outputs the third message to the network device and receives a fourth message in response to the third message, wherein the fourth message does not include the field specifying the replacement L2 hardware address, and wherein the fourth message proposes a lease for a L3 network address.

36. The client device of claim 35,
wherein the first message comprises a dynamic host configuration protocol (DHCP) discover message,
wherein the second message comprises a DHCP offer message having a type-length-value (TLV) field that specifies the replacement L2 hardware address,
wherein the third message comprises another DHCP discover message that includes a client identifier option that specifies the replacement L2 hardware address, and
wherein the fourth message comprises another DHCP offer message that proposes the lease for the L3 network address.

37. The client device of claim 32,
wherein the first message comprises a dynamic host configuration protocol (DHCP) discover message, and
wherein the second message comprises a DHCP offer message having a type-length-value (TLV) field that specifies the replacement L2 hardware address.

38. The client device of claim 32,
wherein the network device comprises either a router that implements a dynamic host configuration protocol (DHCP) server or a stand-alone DHCP server, and
wherein the client device comprises one or more of a wireless access point (WAP), a computer, a laptop, a netbook, a portable device, a wireless handset, a personal digital assistant (PDA), a workstation, an Internet-capable appliance, an Internet-capable television, a printer, a server, a hub, and a switch.

39. The client device of claim 32, wherein the layer two (L2) hardware address included within the first message comprises a null L2 hardware address to indicate the client device supports automatic reconfiguration of the L2 hardware address associated with the network interface of the client device.

40. The client device of claim 32, wherein the first and second messages each conform to either a dynamic host configuration protocol (DHCP) for Internet protocol (IP) version four (DHCPv4) or a DHCP for IP version six (DHCPv6).

41. A non-transitory computer-readable storage medium comprising instructions that cause a processor of a network device to:
receive a first message from a first client device of the network, wherein the first message requests that a layer three (L3) network address be reserved for use by the client device, and wherein the first message includes a layer two (L2) hardware address associated with a physical network interface of the client device, and wherein the first message specifies an indication of whether the client device supports automatic reconfiguration of the L2 hardware address associated with the network interface of the client device;
determine, based on the indication, whether the client device supports automatic reconfiguration of the L2 hardware address associated with the network interface of the client device;
responsive to determining the client device supports automatic reconfiguration of the L2 hardware address associated with the network interface of the client device:
select a replacement L2 hardware address to associate with the network interface of the client device as a replacement for the L2 hardware address included in the first message;
generate a second message having a field that specifies the replacement L2 hardware address; and
output the second message to the client device in response to the first message so as to automatically associate the replacement L2 hardware address with the network interface of the client device.

42. A non-transitory computer-readable storage medium comprising instructions that cause a processor of a client device to:
generate a first message requesting that a layer three (L3) network address be reserved for use by the client device in a network, wherein the first message includes a layer two (L2) hardware address associated with a physical network interface of the client device, and wherein the first message specifies an indication of whether the client device supports automatic reconfiguration of the L2 hardware address associated with the network interface of the client device;
output the first message to a network device responsible for allocating leases for L3 network addresses to client devices;
receive a second message having a field that specifies a replacement L2 hardware address for use in the network as a replacement for the L2 hardware address included in the first message; and
automatically replace the L2 hardware address associated with the network interface of the client device with the replacement L2 hardware address specified in the second message.

43. A network system comprising:
a client device located in a sub-network (subnet) of a network; and
a dynamic host configuration protocol (DHCP) server located in the network that is responsible for allocating leases for L3 network addresses to client devices,
wherein the client device includes:
a first network interface; and
a first control unit that generates a first message requesting that a layer three (L3) network address be reserved for use by the client device in the network, wherein the first message also includes a layer two (L2) hardware address associated with the first network interface, and wherein the first message specifies an indication of whether the client device supports automatic reconfiguration of the L2 hardware address associated with the first network interface, wherein the first network interface outputs the first message to the DHCP server, wherein the DHCP server includes:

a second network interface that receives the first message from the client device; and a second control unit that determines, based on the indication, whether the client device supports automatic reconfiguration of the L2 hardware address associated with the network interface of the client device and, responsive to determining the client device supports automatic reconfiguration of the L2 hardware address associated with the network interface of the client device, selects a replacement L2 hardware address to associate with the first network interface of the client device as a replacement for the L2 hardware address included in the first message and generates a second message having a field that specifies the replacement L2 hardware address, wherein the second network interface outputs the second message to the client device, wherein the first network interface of the client device receives the second message, and wherein the first control unit automatically replaces the L2 hardware address associated with the first network interface of the client device with the replacement L2 hardware address specified in the second message.

44. A method comprising:

generating, with a client device located in a sub-network (subnet) of a network, a first message requesting that a layer three (L3) network address be reserved for use by the client device in the network, wherein the first message also includes a layer two (L2) hardware address associated with an network interface of the client device, and wherein the first message specifies an indication of whether the client device supports automatic reconfiguration of the L2 hardware address associated with the network interface of the client device;

outputting, with the client device, the first message to a network device responsible for allocating leases for L3 network addresses to client devices;

receiving, with the client device, a second message having a field that specifies a replacement L2 hardware address for use in the network as a replacement for the L2 hardware address included in the first message; and indicating, with the client device, to a user of the client device that the user needs to change the L2 hardware address to the replacement L2 hardware address.

45. A method comprising:

generating, with a client device located in a sub-network (subnet) of a network, a first message requesting that a layer three (L3) network address be reserved for use by the client device in the network, wherein the first message specifies an indication of whether the client device supports automatic reconfiguration of the L2 hardware address associated with the network interface of the client device;

outputting, with the client device, the first message to a network device responsible for allocating leases for L3 network addresses to client devices;

receiving, with the client device, a second message having a field that specifies a replacement L2 hardware address for use in the network as a replacement for the L2 hardware address included in the first message; and indicating, with the client device, to a user of the client device that the user needs to change the L2 hardware address to the replacement L2 hardware address.

46. A method comprising:

generating, with a client device located in a sub-network (subnet) of a network, a first message requesting that a layer three (L3) network address be reserved for use by the client device in the network, wherein the first message specifies an indication of whether the client device supports automatic reconfiguration of the L2 hardware address associated with the network interface of the client device;

outputting, with the client device, the first message to a network device responsible for allocating leases for L3 network addresses to client devices;

receiving, with the client device, a second message having a field that specifies a replacement L2 hardware address for use in the network as a replacement for the L2 hardware address included in the first message; and automatically programming, with the client device, a network interface of the client device with the replacement L2 hardware address specified in the second message.

* * * * *